United States Patent [19]

Plouff

[11] Patent Number: 4,696,026

[45] Date of Patent: Sep. 22, 1987

[54] MULTIPLEXED TERMINAL FOR MONITORING AND CONTROLLING A PLURALITY OF REMOTE TELEPHONE SWITCHES

[75] Inventor: Donald A. Plouff, Nobelsville, Ind.

[73] Assignee: General Telephone Company of Indiana, Westfield, Ind.

[21] Appl. No.: 858,474

[22] Filed: Apr. 30, 1986

[51] Int. Cl.[4] ............................................. H04M 3/24
[52] U.S. Cl. ......................................... 379/34; 379/32
[58] Field of Search ................. 379/32, 34, 29, 326, 379/327, 399, 397, 284, 290, 38 V; 333/24 R; 370/13

[56] References Cited

U.S. PATENT DOCUMENTS

| | | | |
|---|---|---|---|
| 4,311,882 | 1/1982 | Johner et al. | 370/13 X |
| 4,332,982 | 6/1982 | Thomas | 379/200 |
| 4,538,033 | 8/1985 | Bruce et al. | 379/28 |

Primary Examiner—Stafford D. Schreyer
Attorney, Agent, or Firm—J. Stephen Yeo

[57] ABSTRACT

A multiplexed terminal monitors the status of a plurality of remote SPC telephone switches simultaneously. A computer has at least one I/O port. A serial communication adapter is coupled to the I/O port and provides a plurality of extended I/O ports. The extended ports are coupled through individual channels to remote SPC switches with remote command and display terminal ports. Software controls the computer to multiplex the extended ports and causes data representing the status and identification of each switch to be displayed simultaneously on a display.

1 Claim, 2 Drawing Figures

1 ADRIAN GTDS  12:10:35  XXX

Alarms area

| OWSO | THRR | BINS | TOCK | LAFW | WOOD | HOFF | PLYM | VITO | DUFF | DAPX | MAGG | LAFE | LAFW | NEDY |
|------|------|------|------|------|------|------|------|------|------|------|------|------|------|------|
| 0cl  | 1cl  | 2OS  | 3cl  | 4Mn  | 5cl  | 6MJ  | 7mk  | 8cl  | 9BL  | ANR  | Bcl  | D    | E    | F    |

Menu processing area

*Fig. 2.*

MULTIPLEXED TERMINAL FOR MONITORING AND CONTROLLING A PLURALITY OF REMOTE TELEPHONE SWITCHES

INFORMATION ON COPYRIGHTED MATERIAL

A portion of the disclosure of this patent document contains material which is subject to copyright protection. The copyright owner has no objection to the facsimile reproduction by anyone of the patent document or the patent disclosure, as it appears in the patent and Trademark Office patent file or records, but otherwise reserves all copyright rights whatsoever.

BACKGROUND OF THE INVENTION

This invention pertains to apparatus for monitoring remote stored program controlled telephone switches and more particularly pertains to means for monitoring a plurality of such switches simultaneously.

A stored Program Controlled (SPC) switch, such as the GTE Communication Corporation GTD-5 switch, generates status data which is transmitted through telephone lines to remote control and display terminals. In general, one terminal is used for each switch to continuously monitor alarm and other status conditions. In addition to monitoring switch functions, the terminal is used to transmit commands to the switch.

If a plurality of switches are to be monitored by a single operator, it will be appreciated that a corresponding number of displays have to be simultaneously scanned. Furthermore, the operator's visual field is limited to one display while he or she is entering commands. Multiple terminals are expensive and space consuming. The advantages which would result from the ability to use one terminal to monitor a plurality of switches are manifest.

SUMMARY OF THE INVENTION

Briefly, according to one aspect of the invention, a computer has at least one input/output (I/O) port. A serial communication adapter is coupled to the I/O port and provides a plurality of extended I/O ports. The extended ports are coupled through individual channels to corresponding remote stored program control switches with remote command and display terminal ports. Software controls the computer to multiplex the extended ports and causes data representing the status and identification of each switch to be displayed simultaneously on a display.

BRIEF DESCRIPTION OF THE DRAWINGS

FIG. 2 is a typical display generated by said terminals.

DETAILED DESCRIPTION OF THE INVENTION

Figure 1:
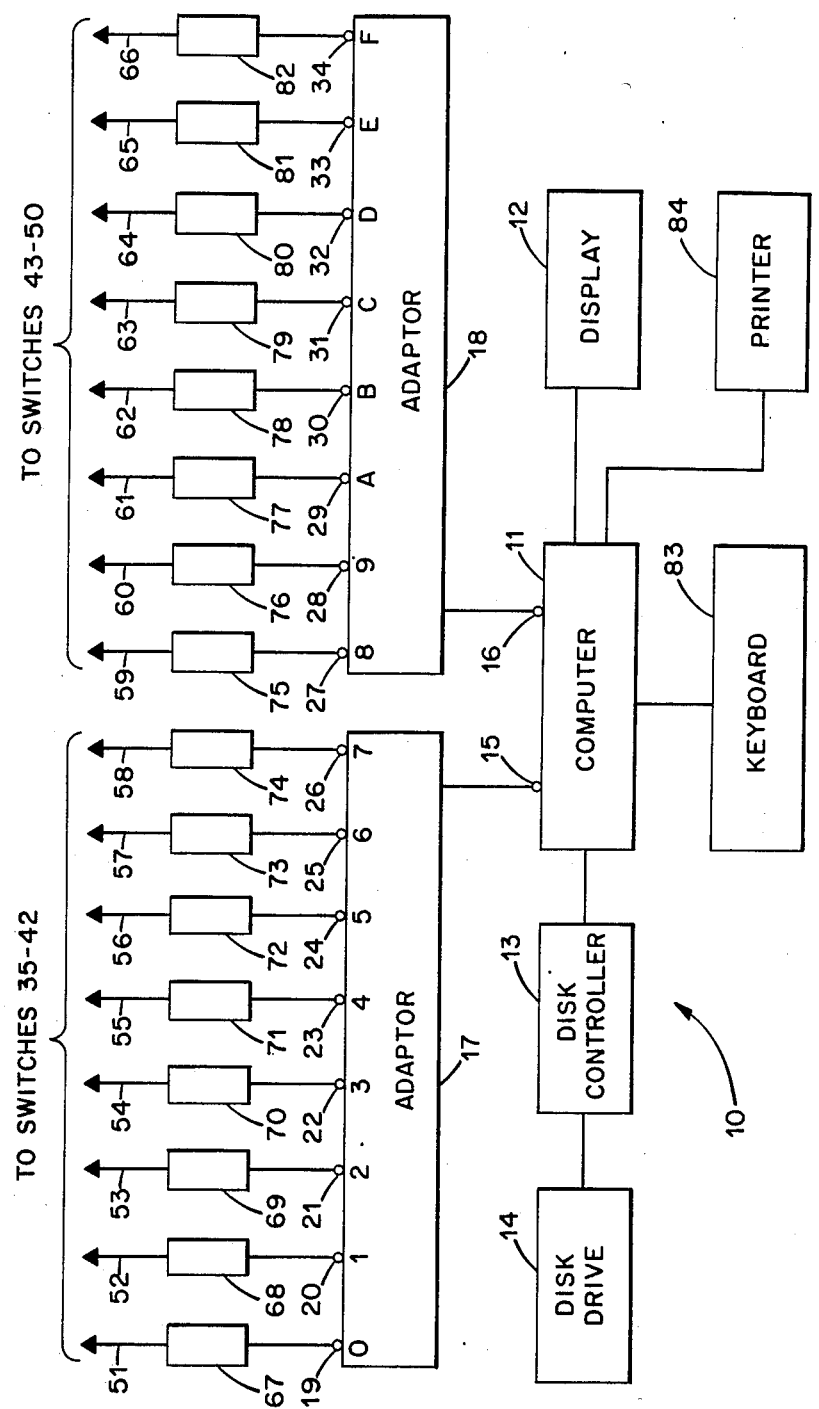
FIG. 1 is a block diagram of a multiplexed terminal embodying the invention.

FIG. 1 is a block diagram representing hardware suitable for protecting the invention. The hardware and the software which controls it are collectively referred to as a multiplexed terminal 10. The hardware includes a personal computer 11, which is preferably an IBM XT TM personal computer equipped with a 512K RAM, and a monochrome display 12. The computer 11 is connected via a disc controller 13 to a disc drive 14.

The computer has at least one input/output (I/O) port. The drawing shows two I/O ports 15, 16. In keeping with the invention, the number of ports are extended by the use of commercially available serial communication adaptors, such as Extend Com 8 TM adaptors made by Decryption Systems Corporation. Each adaptor has eight individual asynchronous serial communication ports, individual address and interrupt DIP switches, and an eight-bit stack port. Each adaptor is coupled to an I/O port. Two such adapters 17, 18 are used in the arrangement shown, resulting in a total of sixteen extended ports 19-34. The extended I/O ports are coupled to a plurality of remotely located Stored Program Control (SPC) telephone switches 35-50 through separate channels 51-66 which may be dedicated telephone lines. The adaptors are controlled by the computer which is instructed by multi-interrupt-driven software. A full duplex modum 67-82 may be used between each extended port and channel on the channel. Alternately, the channel which may may support digital communication without a modem. Each channel is preferably arranged continuously connected to the RCDT port of a corresponding SPC switch.

A listing of one embodiment of the software follows this description, before the claims. The listing is written in Intel 8088/8086 assembly language. The software flow is described in Table 1.

TABLE 1

| | SOFTWARE FLOW |
|---|---|
| •START | Display copyright message |
| | Check available memory |
| INITIALIZATION | Initialize dynamic buffers |
| | (Menu-processing areas) |
| | Initialize parameters |
| | (port names, codes, baud, etc.) |
| | Initialize UARTS (serial hardware) |
| | Initialize serial interrupts |
| | (set up vectors) |
| | Enable interrupts |
| CONTINUOUS LOOP | Get time |
| | Check for keyboard characters |
| | Process function-key requests |
| | Change port displayed and |
| | controlled |
| | Enable/disable port |
| | Mark port |
| | Print upper or lower screens |
| | Test port |
| | Send acknowledgment to GTD-5 |
| | Send screen refresh command |
| | Process menu-processing data |
| | review req'sts (Page up/down, |
| | end) |
| | Check for end-of-program request |
| | (esc-End) If end go to |
| | Termination Routine |
| | Unload input buffers |
| | (place in hoppers) |
| | Unload hoppers |
| | To alarm of menu-processing |
| | areas |
| | Print alarms-set status display |
| | flags |
| | Turn off audible ("Beep" process) |
| | Print one character from printer |
| | buffer |
| | Test display flag |
| | Refresh display data |
| | (alarm display info.) |
| | Display dynamic data |
| | (menu-processing data) |
| 1-SECOND LOOP | Test bell-port for audible or |
| | no-response condition |
| | Display static screen (lines 1-11) |
| | Display port name, time, etc. |
| | Display status lines (lines 12-13) |

TABLE 1-continued
SOFTWARE FLOW

|  |  |
|---|---|
|  | Display dynamic data (lines 14–25) |
|  | Dump dynamic buffers (at 8K data in, dump 5K) |
|  | Test ports inactive-set codes |
|  | Test keyboard response (keyboard timeout) |
| 5-SECOND LOOP | Test alarms off-update status date |
| 20-SECOND LOOP | Test for all-no-response condition |
|  | Reinitialize UARTS if all-NR |
|  | ↑ GO TO CONTINUOUS LOOP |
| TERMINATION ROUTINE | Send termination message to screen and printer |
|  | Complete printing if no errors |
|  | Reestablish cursor and interrupt masks |
| SERIAL PORT INTERRUPT SERVICE ROUTINE | (One each for ports 0-7 and 8-F) |
|  | Entered via serial port interrupt (IRQ3 or IRQ4) |
|  | Save registers |
|  | Check UARTs for character or parity error |
|  | Unload character, place in input buffer |
|  | Check status register for another character in Hardware error if checks exceed 50 |
|  | Restore registers |
|  | Exit |

The software multiplexes the extended I/O ports to accept the incoming Remote Control and Display Terminal (RCDT) data from the switches. The data indicating the status of each port is continuously displayed on the display. A typical display is shown in FIG. 2 wherein the status of sixteen ports are displayed on two lines called port status lines. The status of each port is represented by a cluster of data. The first line of a cluster is a four-character site name. The second line of a cluster shows the port number in a one-character notation and the port status.

In this way, the status of a plurality of switches may be displayed at one time.

The port status is indicated by a two-character code, as listed in order of priority in Table 2.

TABLE 2

| Priority | Code | Port Status |
|---|---|---|
| 1 | OS | Out of Service |
| 2 | NR | No Response |
| 3 | B1 | Bell from Switch |
| 4 | MK | Marked Operator |
| 5 | MJ | Major Alarm Line |
| 6 | MN | Minor Alarm Line |
| 7 | C1 | Port Clear |

An audio signal is activated upon receipt of an alarm condition.

The site name is shown in inverse (white on black) if the switch is in "Night Transfer" mode.

One of the ports can be selected to have the designated port's menu processing (dynamic) data displayed on the lower portion of the screen. The site name of the switch corresponding to the selected port flashes. The corresponding switch may be controlled by the multiplexed terminal as in the same manner as a dedicated RCDT through keyboard 83. The software allows the menu-driven data to be scrolled at the bottom of the screen below the port status lines without losing data. All displayed data may be printed in printer 84 upon command.

The disclosed multiplexed terminal allows a single terminal to monitor a plurality of remote SPC switches, resulting in economy in costs and office space.

The following software listing is copyrighted.

© 1985 General Telephone Company of Indiana, Incorporated.

```
; MACCX SYSTEM PROGRAM          CONSTRUCTION #13    MX13A.ASM MX13B.ASM
;
; D.A. Plouff 10/15/85           SVR 1.1.2.2    Print nxfer change
;
;
; To combine mx13a and mx13b -) copy mx13a.asm+mx13b.asm mx13.asm
;
;
;####################################################
;
STACK    SEGMENT   PARA STACK 'STACK'
         DB        256    DUP(OFFH)  ;256 BYTES OF STACK SPACE
; NOTE:  Change section in INIT_BUFFERS if stack size changes
STACK    ENDS
;
;####################################################
;
DATA     SEGMENT   PARA PUBLIC 'DATA'
;
START_MSG1    DB        'MACCX    SVR 1.1.3.1    10/14/85    $'
              DB        'Copyright (C) 1985    General Telephone '
              DB        'Company of Indiana, Inc.$'
              DB        'a part of GTE Midwestern Telephone Operations $'
JUNK2 DW 'XX'
JUNK3 DB '0123456789ABCDEF'
;--- video variables ---
VIDEO_ADPT   DW    0B000H    ;Starting location of display board
PT_ADPT DW         378H      ;Starting Location of Printer Adapter
D6845_ADDR   DW    03B4H     ;Monochr=3B4H    color=3D4H
D6845_DATA   DW    03B5H     ;Monochr=3B5H    color=3D5H
```

```
SCREEN_2 DW        112
SCREEN   DW        96
COLUMN   DW        0           ;Contains current column for display
ROW      DB        0           ;Contains current row for display
TWO      DW        2           ;Const for multiply instruction
LINE     DW        0           ;Line# for dynamic data
;--- hex character table ---
HEX_CHAR_TABLE DB  '0123456789ABCDEF'
;--- control variables ---
CUR_PORT_NUM    DB      0           ;Comes alive on port 0
CUR_PORT_CHAR   DB      0
CUR_PORT_NAME   DB      16      DUP(' ')
CUR_STATIC_SCREEN_ST DW 0
CUR_DYBUF_ST    DW      0
CUR_DYBUF_END   DW      0
CUR_DYPTR       DW      0
CUR_DISP_FLAG DB 1
ALARM_BUF_ST    DW      0
ALARM_BUF_END   DW      0
PORT_SVCD3      DB      0
PORT_SVCD4      DB      0
EOI_FL3         DB      0
EOI_FL4         DB      0
ACT_BIT_REG     DW      0
DYBUF_DUMP_SWITCH  DW   8000
DYBUF_DUMP_BYTES   DW   5000
DUMP_COUNTER    DW      0
IRQ3_STAT_REG   DW      180H
IRQ4_STAT_REG   DW      188H
IRQ3_CNTR       DB      0
IRQ4_CNTR       DB      0
IRQ3_ERR_FLAG   DB      0
IRQ4_ERR_FLAG   DB      0
STATUS_0        DW      0
STATUS_1        DW      0
STATUS_2        DW      0
STATUS_3        DW      0
STATUS_4        DW      0
STATUS_5        DW      0
STATUS_6        DW      0
STATUS_7        DW      0
STATUS_8        DW      0
STATUS_9        DW      0
STATUS_A        DW      0
STATUS_B        DW      0
STATUS_C        DW      0
STATUS_D        DW      0
STATUS_E        DW      0
STATUS_F        DW      0
NXFER_STATUS    DW      16 DUP(0) ;Night Transfer status reg. 1/port
PORT_NO         DW      0
ACK_REQ_FLAG    DB      0
PORT_ACT_FLAG   DW      0           ;Port come up inactive
KEYIN_CODE DB   0
SEC_5_CNTR      DB      0           ;5 second counter
CR_FLG   DB     0
SEC1     DB     0
SEC5     DB     0
SEC10    DB     0
SEC20    DB     0
TIMER    DW     0
TIMER1   DB     0                   ;Timer for CMD/ERROR display
DTIME_H DW      0
DTIME_M DW      0
DTIME_S DW      0
DDATE_M DW      0
```

```
DDATE_D  DW              0
RESET    DB              0          ;Baleout flag
DIV_10   DB              10
HOURS    DB              0
SECS     DB              0
MSEC     DB              0
MSEC1    DB              0
STATUS2  DB              0
STATUS3  DB              0
STATUS4  DB              0
INTMASK  DB              0
ERROR_FLAG  DB           0
PORT_TEST_FLAG    DB     0
TEST_CHAR         DW     0
TEMP1             DW     0
TEMP2             DW     0
;--- commands ---
CMD1              DB     'DISPLAY PORT (0-E)      '
CMD2              DB     'EN/DISABLE PORT #       '
CMD3              DB     'MARK/UNMARK PORT (0-F)  '
CMD4              DB     'TEST PORT (0-F)         '
CMD5              DB     'Testing port '
CMD6              DB     'TESTS PASSED.   PORT = '
CMD7              DB     'INTERNAL TEST FAILED.   PORT = '
CMD8              DB     'NETWORK TEST FAILED.   PORT = '
CMD9              DB     0
;--- messages ---
;
MSG_1     DB             0DH,'--- MACCX PROGRAM TERMINATED BY OPERATOR ---',
          DB             0DH,'$'
MSG_ERR_0         DB     '--- INSUFFICIENT MEMORY FOR SYSTEM ---','$'
MSG_ERR_1         DB     0AH,0DH,'SEGMENT SET-UP ERROR ===',0AH,0DH,'$'
MSG_ERR_2         DB     'INPUT ERROR          $'
MSG_ERR_3    DB   'CANNOT CREATE DISK FILE$'
MSG_ERR_4    DB   'CANNOT OPEN DISK FILE$'
MSG_ERR_4_1  DB   'CANNOT OPEN "ODD" FILE$'
MSG_ERR_5    DB   'WRITE ERROR TO DISK$'
MSG_ERR_6         DB     'PORT NOT INSTALLED        $'
MSG_ERR_7         DB     'PORT CHAR/NUM ERROR IN "ODD" FILE$'
MSG_ERR_7_1       DB     'FORMAT ERROR IN "ODD" FILE   $'
MSG_ERR_7_2       DB     'ILLEGAL BAUD RATE IN "ODD" FILE $'
MSG_ERR_9         DB     'INPUT DATA ERROR ON PORT $'
MSG_ERR_10        DB     'PRINTER FAULT         $'
MSG_ERR_11        DB     'Printer buffer overflow    $'
MSG_ERR_12        DB     'HARDWARE FAULT - PORTS 0-7  $'
MSG_ERR_13        DB     'HARDWARE FAULT - PORTS 8-F  $'
;
ALARM_MSG_1       DB     'MAJOR '
ALARM_MSG_2       DB     'Minor '
ALARM_MSG_3       DB     'NX ON '
ALARM_MSG_4       DB     'nxoff '
ALARM_MSG_5       DB     'NIGHT TRANSFER "ON" $'
ALARM_MSG_6       DB     'Night Transfer "off" $'
ALARM_MSG_7       DB     'S F M '
ALARM_MSG_8       DB     'CXR   '
;--- port names ---
PORT_NAME_0       DB     16 DUP(' ')
PORT_NAME_1       DB     16 DUP(' ')
PORT_NAME_2       DB     16 DUP(' ')
PORT_NAME_3       DB     16 DUP(' ')
PORT_NAME_4       DB     16 DUP(' ')
PORT_NAME_5       DB     16 DUP(' ')
PORT_NAME_6       DB     16 DUP(' ')
PORT_NAME_7       DB     16 DUP(' ')
PORT_NAME_8       DB     16 DUP(' ')
```

```
PORT_NAME_9        DB      16 DUP(' ')
PORT_NAME_A        DB      16 DUP(' ')
PORT_NAME_B        DB      16 DUP(' ')
PORT_NAME_C        DB      16 DUP(' ')
PORT_NAME_D        DB      16 DUP(' ')
PORT_NAME_E        DB      16 DUP(' ')
PORT_NAME_F        DB      16 DUP(' ')
SITE_CODES         DB      80 DUP(' ')
;--- file names ---
ODDFILE            DB      'MACXPARMODD'
FILENAME_0         DB      'MACXFIL0   '
FILENAME_1         DB      'MACXFIL1   '
FILENAME_2         DB      'MACXFIL2   '
FILENAME_3         DB      'MACXFIL3   '
FILENAME_4         DB      'MACXFIL4   '
FILENAME_5         DB      'MACXFIL5   '
FILENAME_6         DB      'MACXFIL6   '
FILENAME_7         DB      'MACXFIL7   '
FILENAME_8         DB      'MACXFIL8   '
FILENAME_9         DB      'MACXFIL9   '
FILENAME_A         DB      'MACXFILA   '
FILENAME_B         DB      'MACXFILB   '
FILENAME_C         DB      'MACXFILC   '
FILENAME_D         DB      'MACXFILD   '
FILENAME_E         DB      'MACXFILE   '
FILENAME_F         DB      'MACXFILF   '
;--- file control variables
FCB       DB        36 DUP(0)
DTA       DB        0
DTA1      DB        1440 DUP(0)
;--- dynamic data variables ---
JUNK4     DW        '@@'
LINE_UP_CNTR       DW      0
DYN_REV_PTR        DW      0
DYN_REV_FLAG       DB      0
DYBUF_START_0      DW      0
DYPTR_0            DW      0
DYBUF_END_0        DW      0
DYBUF_START_1      DW      0
DYPTR_1            DW      0
DYBUF_END_1        DW      0
DYBUF_START_2      DW      0
DYPTR_2            DW      0
DYBUF_END_2        DW      0
DYBUF_START_3      DW      0
DYPTR_3            DW      0
DYBUF_END_3        DW      0
DYBUF_START_4      DW      0
DYPTR_4            DW      0
DYBUF_END_4        DW      0
DYBUF_START_5      DW      0
DYPTR_5            DW      0
DYBUF_END_5        DW      0
DYBUF_START_6      DW      0
DYPTR_6            DW      0
DYBUF_END_6        DW      0
DYBUF_START_7      DW      0
DYPTR_7            DW      0
DYBUF_END_7        DW      0
DYBUF_START_8      DW      0
DYPTR_8            DW      0
DYBUF_END_8        DW      0
DYBUF_START_9      DW      0
DYPTR_9            DW      0
DYBUF_END_9        DW      0
DYBUF_START_A      DW      0
```

```
DYPTR_A              DW      0
DYBUF_END_A          DW      0
DYBUF_START_B        DW      0
DYPTR_B              DW      0
DYBUF_END_B          DW      0
DYBUF_START_C        DW      0
DYPTR_C              DW      0
DYBUF_END_C          DW      0
DYBUF_START_D        DW      0
DYPTR_D              DW      0
DYBUF_END_D          DW      0
DYBUF_START_E        DW      0
DYPTR_E              DW      0
DYBUF_END_E          DW      0
DYBUF_START_F        DW      0
DYPTR_F              DW      0
DYBUF_END_F          DW      0
;--- input port buffer pointer variables ---
INPTR_LOAD_0         DW      0
INPTR_LOAD_1         DW      0
INPTR_LOAD_2         DW      0
INPTR_LOAD_3         DW      0
INPTR_LOAD_4         DW      0
INPTR_LOAD_5         DW      0
INPTR_LOAD_6         DW      0
INPTR_LOAD_7         DW      0
INPTR_LOAD_8         DW      0
INPTR_LOAD_9         DW      0
INPTR_LOAD_A         DW      0
INPTR_LOAD_B         DW      0
INPTR_LOAD_C         DW      0
INPTR_LOAD_D         DW      0
INPTR_LOAD_E         DW      0
INPTR_LOAD_F         DW      0
INPTR_UNLOAD_0       DW      0
INPTR_UNLOAD_1       DW      0
INPTR_UNLOAD_2       DW      0
INPTR_UNLOAD_3       DW      0
INPTR_UNLOAD_4       DW      0
INPTR_UNLOAD_5       DW      0
INPTR_UNLOAD_6       DW      0
INPTR_UNLOAD_7       DW      0
INPTR_UNLOAD_8       DW      0
INPTR_UNLOAD_9       DW      0
INPTR_UNLOAD_A       DW      0
INPTR_UNLOAD_B       DW      0
INPTR_UNLOAD_C       DW      0
INPTR_UNLOAD_D       DW      0
INPTR_UNLOAD_E       DW      0
INPTR_UNLOAD_F       DW      0
;--- input port buffers
INBUF_0    DB  1024  DUP(10H)
INBUF_1    DB  1024  DUP(1H)
INBUF_2    DB  1024  DUP(2H)
INBUF_3    DB  1024  DUP(3H)
INBUF_4    DB  1024  DUP(4H)
INBUF_5    DB  1024  DUP(5H)
INBUF_6    DB  1024  DUP(6H)
INBUF_7    DB  1024  DUP(7H)
INBUF_8    DB  1024  DUP(8H)
INBUF_9    DB  1024  DUP(9H)
INBUF_A    DB  1024  DUP(0AH)
INBUF_B    DB  1024  DUP(0BH)
INBUF_C    DB  1024  DUP(0CH)
INBUF_D    DB  1024  DUP(0DH)
```

```
INBUF_E     DB   1024   DUP(0EH)
INBUF_F     DB   1024   DUP(0FH)

;--- uart ports
UART_0   DW       100H
UART_1   DW       108H
UART_2   DW       110H
UART_3   DW       118H
UART_4   DW       120H
UART_5   DW       128H
UART_6   DW       130H
UART_7   DW       138H
UART_8   DW       140H
UART_9   DW       148H
UART_A   DW       150H
UART_B   DW       158H
UART_C   DW       160H
UART_D   DW       168H
UART_E   DW       170H
UART_F   DW       178H
BAUD_RATE_CODES DB      16 DUP(0)
;--- printer variables & buffer
PT_ERR_FLAG     DB      0
PT_LOAD         DW      0
PT_UNLOAD       DW      0
PT_BUFFER       DB 6144 DUP ('p')
DSCREEN_BUFFER  DB 1040 DUP(' ')
DSCREEN_BUFR_END DW     0
;--- hopper pointer variables
DYB_ST          DW      0
DYPTR           DW      0
ST_SCRN         DW      0
HPORT           DW      0
HLOAD           DW      0
HLOAD_0         DW      0
HLOAD_1         DW      0
HLOAD_2         DW      0
HLOAD_3         DW      0
HLOAD_4         DW      0
HLOAD_5         DW      0
HLOAD_6         DW      0
HLOAD_7         DW      0
HLOAD_8         DW      0
HLOAD_9         DW      0
HLOAD_A         DW      0
HLOAD_B         DW      0
HLOAD_C         DW      0
HLOAD_D         DW      0
HLOAD_E         DW      0
HLOAD_F         DW      0
HUNLOAD         DW      0
HUNLOAD_0       DW      0
HUNLOAD_1       DW      0
HUNLOAD_2       DW      0
HUNLOAD_3       DW      0
HUNLOAD_4       DW      0
HUNLOAD_5       DW      0
HUNLOAD_6       DW      0
HUNLOAD_7       DW      0
HUNLOAD_8       DW      0
HUNLOAD_9       DW      0
HUNLOAD_A       DW      0
HUNLOAD_B       DW      0
HUNLOAD_C       DW      0
HUNLOAD_D       DW      0
```

```
HUNLOAD_E          DW         0
HUNLOAD_F          DW         0
;--- hopper buffers
HOPPER             DB         1024 DUP('h')
HOPPER_0           DB         1024 DUP(0)
HOPPER_1           DB         1024 DUP(0)
HOPPER_2           DB         1024 DUP(0)
HOPPER_3           DB         1024 DUP(0)
HOPPER_4           DB         1024 DUP(0)
HOPPER_5           DB         1024 DUP(0)
HOPPER_6           DB         1024 DUP(0)
HOPPER_7           DB         1024 DUP(0)
HOPPER_8           DB         1024 DUP(0)
HOPPER_9           DB         1024 DUP(0)
HOPPER_A           DB         1024 DUP(0)
HOPPER_B           DB         1024 DUP(0)
HOPPER_C           DB         1024 DUP(0)
HOPPER_D           DB         1024 DUP(0)
HOPPER_E           DB         1024 DUP(0)
HOPPER_F           DB         1024 DUP(0)
;--- static screen area buffers
STATIC_SCREEN_0    DB         960 DUP(' ')
STATIC_SCREEN_1    DB         960 DUP(' ')
STATIC_SCREEN_2    DB         960 DUP(' ')
STATIC_SCREEN_3    DB         960 DUP(' ')
STATIC_SCREEN_4    DB         960 DUP(' ')
STATIC_SCREEN_5    DB         960 DUP(' ')
STATIC_SCREEN_6    DB         960 DUP(' ')
STATIC_SCREEN_7    DB         960 DUP(' ')
STATIC_SCREEN_8    DB         960 DUP(' ')
STATIC_SCREEN_9    DB         960 DUP(' ')
STATIC_SCREEN_A    DB         960 DUP(' ')
STATIC_SCREEN_B    DB         960 DUP(' ')
STATIC_SCREEN_C    DB         960 DUP(' ')
STATIC_SCREEN_D    DB         960 DUP(' ')
STATIC_SCREEN_E    DB         960 DUP(' ')
STATIC_SCREEN_F    DB         960 DUP(' ')
;--- Pop-Up screen 1 -----
POP_UP1            DB         0C9H, 28 DUP(0CDH), 0BBH
                   DB         0BAH,'F1   MACCX HELP Screen        ',0BAH
                   DB         0BAH,'F3   Change Port              ',0BAH
                   DB         0BAH,'F4   Enabe/Disable Port       ',0BAH
                   DB         0BAH,'F5   Mark Port                ',0BAH
                   DB         0BAH,'F6   Print Upper Screen       ',0BAH
                   DB         0BAH,'F7   Port Test                ',0BAH
                   DB         0BAH,'F8   Print Lower Screen       ',0BAH
                   DB         0BAH,'F9   Send Acknowledge (Esc-0)',0BAH
                   DB         0BAH,'F10  Send Screen Refresh      ',0BAH
                   DB         0C8H, 28 DUP(0CDH), 0BCH
;
DATA    ENDS
;
;#########################################################
;
CODE    SEGMENT    PARA PUBLIC 'CODE'
START   PROC       FAR
;
;STANDARD PROGRAM PROLOGUE
;
        ASSUME    CS:CODE
        PUSH      DS           ;SAVE PSP SEGMENT ADDRESS
        MOV       AX,0
        PUSH      AX           ;SAVE RET ADDR OFFSET   (PSP+0)
        MOV       AX,DATA      ;SET UP DATA SEG REG
        MOV       DS,AX
        ASSUME    DS:DATA
```

```
              JMP       DSEG1
DSEG    DW        0
DSEG1:  MOV       DSEG,AX
        MOV       AX,VIDEO_ADPT     ;Point ES to video adapter board
        MOV       ES,AX      ;      << ES DEFAULTS TO VIDEO ADPT >>
;
;   Clear screen !  Display start & copyright messages
        MOV       DI,0
        MOV       CX,2000
        MOV       AX,720H    ;Blanks
        REP       STOSW
        MOV       SI,OFFSET START_MSG1
        MOV       DI,320
        MOV       AH,70H     ;Inverse
M:      STOSW
        LODSB
        CMP       AL,'$'
        JNE       M
        MOV       DI,640
        MOV       AX,720H
M_O:    STOSW
        LODSB
        CMP       AL,'$'
        JNE       M_O
        MOV       DI,844
        MOV       AX,720H
M_OO:   STOSW
        LODSB
        CMP       AL,'$'
        JNE       M_OO
;  Delay for display
        MOV       CX,0FF00H          ;DELAY
        MOV       AX,0
        MOV       DX,10
M_:     MUL       DX
        LOOP      M_
;
;  Check for available memory
        INT       12H        ;Returns w/ AX = memory size in Kbytes
        CMP       AX,140     ;320K
        JGE       MOO
        MOV       SI,OFFSET MSG_ERR_0
        MOV       CX,OFFSET MSG_ERR_1
        SUB       CX,SI
        MOV       DI,640
        MOV       AH,70H     ;Inverse
M_1:    LODSB
        STOSW
        LOOP      M_1
        RET
;
;
;
;*******************************
;
;   MAIN STREAM SECTION
;
;*******************************
;
;
;
MOO:    CLI                                  ;Disable interrupts
;  Initialization
        CALL      INIT_BUFFERS               ;Set up dynamic buffers
        CALL      INIT_PARAMETERS            ;Load port names, numbers, baud
        CALL      INIT_UARTS                 ;Set up UARTs
```

```
            CALL    INIT_SERIAL_INT         ;Establish interrupt vectors
;====       INIT_DISK_FILES
M0:         CALL    ENABLE_INT
            CMP     ERROR_FLAG,1            ;Check for set-up error
            JNE     M02
            JMP     EXIT2
M02:        STI
            MOV     CUR_PORT_NUM,0          ;Come alive on port 0
            CALL    CURRENT_LOAD            ;Load current stat. disp info.
            CALL    CLEAR_SCREEN
; ===== Main loop =====
M10:        CALL    GET_TIME
; Display IRQ indicator
            MOV     BX,116
            MOV     AL,STATUS3
            MOV     AH,07H
            MOV     ES:[BX],AX
            MOV     BX,118
            MOV     AL,STATUS4
            MOV     ES:[BX],AX
            CALL    KBXMIT                  ;Check keyboard for character
            CMP     RESET,1                 ;Check reset flag
            JE      EXIT                    ;Bale out
            CALL    UNLOAD_INPUT_BUFFERS    ;Move serial input data into hoppr
            CALL    UNLOAD_HOPPERS          ;Move buffer data into hopper
            CALL    BELL_OFF                ;Turn off audible if on
            CALL    PRINT_IT                ;Print 1 char from pntr buffer CMP     CUR_DISP_FLAG,1
            JNE     M11
            CALL    CURRENT_LOAD            ;Refresh display data
            CALL    DISPLAY_DYNAMIC_INFO    ;Lower screen lines 14-25
M11:        CMP     SEC1,1                  ;One second loop
            JNE     M10
            MOV     SEC1,0
            CALL    TEST_BELL               ;Test port for audible or NR
            CALL    DISPLAY_STATIC_INFO     ;Upper screen lines 1-12
            CALL    DISPLAY_PORT_NAME
            CALL    DISPLAY_TIME
            CALL    DISPLAY_STATUS          ;Lines 12-13
            CALL    DISPLAY_DYNAMIC_INFO    ;Lower screen lines 14-25
            CALL    DUMP_DYNAMIC_BUFFERS
            CALL    TEST_PORTS_INACTIVE     ;Line 12 info
            CALL    TEST_KEYIN_RESP
; 5-second loop
            CMP     SEC5,5
            JL      M15
            MOV     SEC5,0
            CALL    TEST_ALARMS_OFF         ;Test absence of alarms / update status
            CALL    PRINT_NXFER_CHANGE      ;Print when nxfer goes in & out
; 20-second loop
M15:        CMP     SEC20,20
            JL      M20
            MOV     SEC20,0
            CALL    TEST_NR                 ;Test for no resp. on all installed/up ports
;***        MOV     IRQ3_ERR_FLAG,0
;***        MOV     IRQ4_ERR_FLAG,0
M20:        JMP     M10
;
EXIT:       CALL    CLEAR_SCREEN
; Place message on screen and printer
            MOV     DI,640                  ;Line 9
            MOV     SI,OFFSET MSG_1         ;"Program terminated by ..."
            MOV     AH,7
```

```
M22:    LODSB
        CMP     AL,'$'
        JE      M24
        STOSW                       ;Send to screen
        CALL    PT_BUFR_LD          ;  and to printer
        JMP     M22
M24:    CALL    PRINT_IT            ;Wait for pntr bufr to empty before ex.
        CMP     PT_ERR_FLAG,1
        JE      EXIT2               ;Printer error - quit anyway
        MOV     BX,PT_LOAD
        CMP     BX,PT_UNLOAD
        JNE     M24
;  RESET Restore
EXIT2:  MOV     DX,D6845_ADDR       ;Reestablish cursor
        MOV     AL,10
        OUT     DX,AL
        INC     DX
        MOV     AL,11
        OUT     DX,AL
        DEC     DX
        MOV     AL,11
        OUT     DX,AL
        INC     DX
        MOV     AL,12
        OUT     DX,AL
        MOV     AL,INTMASK
        OUT     21H,AL
        STI                         ;Interrupts back on
        RET
;
;*******************************
;
;   SUBROUTINES SECTION
;
;*******************************
;
;
;----- LOAD NEW POINTERS -----
;
CURRENT_LOAD PROC NEAR              ;Load current static display info.
        PUSH    ES
        MOV     AX,DS
        MOV     ES,AX
        MOV     AX,0
        MOV     AL,CUR_PORT_NUM
        MOV     DX,16
        MUL     DX                  ;(AX=AL*16)
        MOV     SI,OFFSET PORT_NAME_0
        ADD     SI,AX               ;Point to name of this port
        MOV     BX,SI
        MOV     DI,OFFSET CUR_PORT_NAME
        MOV     CX,8
        REP     MOVSW   ;16 bytes
        POP     ES
;  Get current port character
        MOV     BL,CUR_PORT_NUM
        CMP     BL,10
        JL      CL1
        ADD     BL,7H
CL1:    ADD     BL,30H
        MOV     CUR_PORT_CHAR,BL
        CALL    DISPLAY_PORT_NAME
;  Determine current static screen address
        MOV     AX,0
        MOV     AL,CUR_PORT_NUM
```

```
                MOV     CL,AL
                MOV     DX,960          ;960 byte per screen : lines 1-12
                MUL     DX
                MOV     BX,OFFSET STATIC_SCREEN_0
                ADD     BX,AX
                MOV     CUR_STATIC_SCREEN_ST,BX
;       Determine current dynamic screen variables
                MOV     AX,0
                MOV     AL,CL           ;Port#
                MOV     DX,6            ;port*3*2
                MUL     DX              ;AX=AL*3
                MOV     BX,AX
                MOV     CX,[DYBUF_START_0 + BX]
                MOV     CUR_DYBUF_ST,CX
                INC     BX
                INC     BX
                MOV     CX,[DYBUF_START_0 + BX]
                MOV     CUR_DYPTR,CX
                INC     BX
                INC     BX
                MOV     CX,[DYBUF_START_0 + BX]
                MOV     CUR_DYBUF_END,CX
                RET
CURRENT_LOAD    ENDP
;
;----- KEYBOARD INPUT & TRANSMIT -----
;
KBXMIT  PROC    NEAR            ;Scan kybd for input : output data to cur port
;       Check for struck key
                MOV     AH,1            ;Ck if key has been struck
                INT     16H             ;ZF=0 if key was struck
                JNZ     K1
                RET
;       Get ASCII character & scan code
K1:             MOV     AH,0
                INT     16H
;       Test keyin for port#
                CMP     KEYIN_CODE,1    ;Waiting on keyin?
                JNE     K0
                JMP     K3A
K0:             CMP     KEYIN_CODE,2    ;Enable/Disable port
                JNE     K01
                JMP     K4A
K01:            CMP     KEYIN_CODE,3    ;Reset?
                JE      K1C
                CMP     KEYIN_CODE,4    ;Toggle port mark
                JNE     K02
                JMP     K5A
K02:            CMP     KEYIN_CODE,5    ;Port test
                JNE     K03
                JMP     K7A
K03:            CMP     AL,0            ;Test for function code
                JE      K1_0
                JMP     K10
;       Process function codes
K1_0:           CMP     AH,82           ;INS or DEL?
                JL      K1A
                RET
K1A:            CMP     AH,72           ;Cursor cntl/break?
                JL      K2
                CALL    DYN_DATA_REVIEW_CALC
                RET
K1C:            CMP     AH,4FH          ;"END"
                JE      K1D
                RET
```

```
K1D:    MOV     RESET,1
        RET
K2:     CMP     AH,59           ;F1 - HELP
        JNE     K3
        CALL    DISPLAY_POP_UP1
        RET
K3:     CMP     AH,61           ;F3 - Change port
        JNE     K4
        MOV     SI,OFFSET CMD1  ;Keyin cmd set-up
        MOV     CX,OFFSET CMD2
        CALL    DISP_KEYIN_CMD  ;Display cmd - wait for input
        MOV     KEYIN_CODE,1
        RET
K3A:    CALL    KEYIN_PORT      ;Get port number in AL
        CMP     AH,99           ;Error?
        JNE     K3B
        RET
K3B:    MOV     CUR_PORT_NUM,AL
        CALL    CURRENT_LOAD    ;Load new pointers
        CALL    CLEAR_DSCREEN   ;Clear lines 14-25
;   Clear dyn data review variables
        MOV     DYN_REV_FLAG,0
        MOV     LINE_UP_CNTR,0
        MOV     CUR_DISP_FLAG,1 ;Display dynamic data for this port
        RET
K4:     CMP     AH,62           ;F4 - Enable/Disable port
        JNE     K5
        MOV     SI,OFFSET CMD2
        MOV     CX,OFFSET CMD3
        CALL    DISP_KEYIN_CMD
        MOV     KEYIN_CODE,2
        RET
K4A:    CALL    KEYIN_PORT
        CMP     AH,99   ;Error?
        JNE     K4B
        RET
K4B:    CALL    TOGGLE_PORT_ABLE
        RET
K5:     CMP     AH,63           ;F5 - Mark / Umark port?
        JNE     K6
        MOV     SI,OFFSET CMD3
        MOV     CX,OFFSET CMD4
        CALL    DISP_KEYIN_CMD
        MOV     KEYIN_CODE,4
        RET
K5A:    CALL    KEYIN_PORT
        CMP     AH,99           ;Error?
        JNE     K5B
        RET
K5B:    CALL    TOGGLE_PORT_MARK
        RET
K6:     CMP     AH,64           ;F6 - Print Static Screen
        JNE     K7
        CALL    PRINT_SSCREEN   ;Print screen top 12 lines
        RET
K7:     CMP     AH,65           ;F7 - Port Test
        JNE     K8
        MOV     SI,OFFSET CMD4
        MOV     CX,OFFSET CMD5
        CALL    DISP_KEYIN_CMD
        MOV     KEYIN_CODE,5
        RET
K7A:    CALL    KEYIN_PORT
        CMP     AH,99           ;Error?
```

```
            JNE     K7B
            RET
K7B:        CALL    PORT_TEST
            RET
K8:         CMP     AH,66               ;F8 - Print Dynamic Screen
            JNE     K10
            CALL    PRINT_DSCREEN       ;Print lines 15-25
            RET
K10:        NOP
K11:        CMP     AH,67               ;F9 - ESC-O  ACKNOWLEDGE
            JNE     K12
            MOV     AL,1BH              ;ESC
            CALL    XMIT_CHAR
            MOV     AL,'O'
            CALL    XMIT_CHAR
            CALL    CLEAR_BELL
            RET
K12:        CMP     AH,68               ;F10 - ESC-1  SCREEN REFRESH
            JNE     K13
            CALL    CLEAR_SCREEN
            MOV     AL,1BH              ;ESC
            CALL    XMIT_CHAR
            MOV     AL,'1'
            CALL    XMIT_CHAR
            RET
K13:        CMP     AH,1                ;ESC key code?
            JNE     K14
            MOV     KEYIN_CODE,3
            MOV     TIMER1,1
            RET
K14:        CALL    XMIT_CHAR
            RET
KBXMIT      ENDP
;
XMIT_CHAR   PROC    NEAR        ;Transmit character in AL
;  Check line status reg for xmit-holding reg empty
KBX1_1:     PUSH    AX          ;Save character
            MOV     AX,0
            MOV     AL,CUR_PORT_NUM
            MOV     SI,AX
            SHL     SI,1                ;*2
            MOV     DX,[UART_0 + SI]    ;UART start address for this port
            ADD     DX,5                ;Addr of status line reg.
            PUSH    CX
            MOV     CX,2047     ;Max tries
KBX1:       IN      AL,DX
            TEST    AL,20H      ;Test bit 5 - xmit-holding reg empty?
            JNZ     KBX2        ;Ready
            DEC     CX
            CMP     CX,0
            JNZ     KBX1        ;Try again
            POP     CX
            POP     AX
            RET                 ;UART won't ready - BAIL OUT
KBX2:       POP     CX
            POP     AX          ;Regain character
;  Transmit keyboard character
            MOV     DX,[UART_0 + SI]    ;Addr of xmtr-holding reg.
            OUT     DX,AL
;  Place char. xmitted in status area top of screen
            MOV     AH,7
            MOV     BX,SCREEN_2
            MOV     ES:[BX],AX
            RET
XMIT_CHAR   ENDP
```

```
;
;----- KEYBOARD INPUT : LOCAL CONTROLS -----
;
DISP_KEYIN_CMD  PROC    NEAR
; Place command on screen
        SUB     CX,SI           ;Length of command
        MOV     DI,1760         ;Line 12
        MOV     AH,0FOH         ;Attribute
DKI1:   LODSB
        STOSW
        LOOP    DKI1
; Place space after command
        MOV     AH,07H          ;Normal attribute
        MOV     AL,' '
        STOSW
        STOSW
        MOV     TIMER1,5        ;5 second display
        RET
DISP_KEYIN_CMD  ENDP
;
KEYIN_PORT      PROC    NEAR
        MOV     KEYIN_CODE,0    ;Clear code
; Convert ASCII input code to current port number
        MOV     BL,AL
; Check for valid port number
        CMP     AL,46H          ;Character > 'F'
        JG      KIERR
        CMP     AL,30H          ;Characters < '0'
        JL      KIERR
        SUB     AL,30H
        CMP     AL,9H           ;Chars 0-9
        JLE     KI4
        CMP     AL,10H          ;Chars between 9 & A
        JLE     KIERR
        SUB     AL,7H
KI4:    JMP     KICL            ;Clear input line
; Illegal port character
KIERR:  MOV     SI,OFFSET MSG_ERR_2
        MOV     TIMER1,3        ;3 second display
        CALL    DISP_ERROR_MSG
        MOV     AH,99
        RET
KICL:   MOV     AH,0
        MOV     TIMER1,0
        RET
KEYIN_PORT      ENDP
;
TEST_KEYIN_RESP PROC    NEAR    ;Input timeout test
        CMP     KEYIN_CODE,0    ;Error when KEYIN_CODE not 0 & TIMER1=0
        JNZ     TK1
        RET
TK1:    CMP     TIMER1,0
        JZ      TK2
        RET
TK2:    MOV     SI,OFFSET MSG_ERR_2
        MOV     TIMER1,3
        CALL    DISP_ERROR_MSG
        MOV     KEYIN_CODE,0
        RET
TEST_KEYIN_RESP ENDP
;
;
;----- UNLOAD INPUT BUFFERS -----
;
```

```
UNLOAD_INPUT_BUFFERS    PROC    NEAR        ;Dump buffer data into hoppers
            MOV     CX,0
            MOV     ACT_BIT_REG,1
            JMP     U01
U0:         INC     CX
            ROL     ACT_BIT_REG,1
            CMP     CX,16       ;####
            JL      U01
            RET
U01:        MOV     SI,CX
            SHL     SI,1                ;*2
            MOV     DX,[STATUS_0 + SI]
            TEST    DX,1                ;Installed?
            JZ      U0
            TEST    DX,10H              ;Turned down?
            JNZ     U0                  ;Don't unload
            MOV     AX,CX
            MOV     DX,1024
            MUL     DX
            MOV     DI,AX
U01A:       CLI
            MOV     BX,[INPTR_UNLOAD_0 + SI]
            CMP     BX,[INPTR_LOAD_0 + SI]  ;Buffer empty?
            JNZ     U02         ;Not empty
            STI
            JMP     U0                  ;Next port
; Get serial character from buffer
U02:        MOV     AL,[INBUF_0 + DI + BX]  ;Get character
            INC     BX
            CMP     BX,1024             ;Ck for wrap around
            JC      U03                 ;Branch if not
            MOV     BX,0                ;Yes - wrap around
U03:        MOV     [INPTR_UNLOAD_0 + SI],BX    ;Update pointer
            STI
            MOV     DX,ACT_BIT_REG
            OR      PORT_ACT_FLAG,DX    ;Set port activity flag
; Check for bell char.
            CMP     AL,7                ;BELL?
            JNE     U04
            OR      [STATUS_0 + SI],40H ;Set bell bit 6 in status reg.
            JMP     U01A                ;DO NOT store bell characters
; Move character to hopper
U04:        MOV     BX,[HLOAD_0 + SI]
            MOV     [HOPPER_0 + DI + BX],AL ;Store char
            INC     BX
            CMP     BX,1024
            JC      U05
            MOV     BX,1023             ;Loose char
U05:        MOV     [HLOAD_0 + SI],BX
            JMP     U01A                ;Go for more
UNLOAD_INPUT_BUFFERS ENDP
;
;-----UNLOAD HOPPERS-----
;
UNLOAD_HOPPERS  PROC    NEAR
; Check hoppers for at least 5 characters in
            MOV     HPORT,0
            JMP     H01
H00:        INC     HPORT               ;Next port
            CMP     HPORT,16            ;####
            JL      H01
            RET
H01:        MOV     SI,HPORT
            MOV     CX,SI               ;Save port#
            SHL     SI,1                ;*2
```

```
              MOV     BX,[STATUS_O + SI]       ;Installed?
              TEST    BX,1
              JZ      H00
              TEST    BX,10H                   ;Turned down?
              JNZ     H00
              MOV     BX,[HLOAD_O + SI]        ;BX will contain load ptr
              CMP     BX,5                     ;Need at least 5 chars
              JL      H00
; Set up data & variable areas for this port
              MOV     AX,[HUNLOAD_O + SI]
              CMP     AX,BX                    ;Load & unload ptrs same?
              JE      H00
              MOV     HUNLOAD,AX
              MOV     AX,CX                    ;Port#
              MOV     DX,6
              MUL     DX
              MOV     SI,AX
              MOV     AX,[DYBUF_START_O + SI]
              MOV     DYB_ST,AX
              MOV     AX,[DYPTR_O + SI]
              MOV     DYPTR,AX
              MOV     DX,960
              MOV     AX,CX
              MUL     DX
              MOV     SI,AX
              MOV     AX,OFFSET STATIC_SCREEN_O
              ADD     AX,SI
              MOV     ST_SCRN,AX
; Set up scratch hopper
              MOV     AX,CX                    ;Port#
              MOV     DX,1024
              MUL     DX
              MOV     SI,AX
              MOV     AX,OFFSET HOPPER_O
              ADD     AX,SI
              MOV     SI,AX
              MOV     DI,OFFSET HOPPER
              PUSH    ES
              MOV     AX,DATA
              MOV     ES,AX
              MOV     CX,BX                    ;Move "HLOAD" bytes
              REP     MOVSB
              POP     ES
H00:          MOV     SI,HUNLOAD
; Look for first ESC starting at unload ptr
H001:         MOV     AL,[HOPPER + SI]         ;Get char
              CMP     AL,1BH                   ;ESC ?
              JE      H002
              INC     SI
              CMP     SI,BX                    ;BX=load ptr
              JE      H00STEP
              JMP     H001
H00STEP:  JMP H00                              ;Stepping stone
; Look for "Y" after ESC
H002:         INC     SI
              CMP     SI,BX
              JE      H00STEP                  ;Not enough data
              MOV     AL,[HOPPER + SI]
              CMP     AL,1BH                   ;ESC
              JNE     H003
              MOV     HUNLOAD,SI
              JMP     HOPR_ERR                 ;ESC-ESC
H003:         CMP     AL,'Y'
              JE      H010
; Process ESC-not-Y ; look for next ESC
```

```
H004:   INC     SI
        CMP     SI,BX
        JE      HOOSTEP         ;Not enough
        MOV     AL,[CHOPPER + SI]
        CMP     AL,1BH          ;ESC ?
        JNE     H004
        MOV     HUNLOAD,SI
        JMP     HREST1
;
HOOUT:  JMP     HOOSTEP
;   Process ESC-Y
H010:   INC     SI
        CMP     SI,BX
        JE      HOOUT
        MOV     AL,[CHOPPER + SI]       ;Line# char
        CMP     AL,1BH
        JNE     H011
        MOV     HUNLOAD,SI
        JMP     HOPR_ERR        ;ESC-Y-ESC
;   Determine static or dynamic display data
H011:   CMP     AL,20H
        JL      H011A           ;Line# <0
        CMP     AL,2AH          ;Line 12
        JLE     H011B
H011A:  JMP     H030
;___ STATIC ___           ;Move data from hopper to static scrn buffr
H011B:  PUSH    AX
        MOV     AH,0
        SUB     AL,20H          ;AL has line#
        MOV     DX,80
        MUL     DX              ;AX=AL*DX
        MOV     LINE,AX
        POP     AX
        INC     SI
        CMP     SI,BX
        JE      HOOUT           ;Not enough
        PUSH    ES
        MOV     AX,DATA
        MOV     ES,AX
        MOV     DI,ST_SCRN
        MOV     AL,[CHOPPER + SI]
;   Determine col# in static scrn buffer
H012:   PUSH    AX
        MOV     AH,0
        SUB     AL,20H          ;AL has col#
        MOV     DL,AL
        ADD     DI,LINE
        ADD     DI,AX
        POP     AX
;   Get start of alarm data
        INC     SI
        CMP     SI,BX
        JE      H015
        MOV     ALARM_BUF_ST,SI
        JMP     H013A
;   Move data to static screen buffer
H013:   INC     SI
        CMP     SI,BX
        JE      H015            ;Not enough
H013A:  MOV     AL,[CHOPPER + SI]
        CMP     AL,1BH          ;ESC?
        JE      H015A
        INC     DL              ;Column cntr
        CMP     DL,80           ;80 cols max
        JG      H013            ;Still need to find next ESC
```

```
                STOSB
                JMP     H013
H015:           POP     ES
                JMP     H0OUT
H015A:          POP     ES
                MOV     HUNLOAD,SI
;   Ck for MJA: or MNA: in alarm data
                PUSH    BX
                PUSH    SI
                MOV     DI,OFFSET HOPPER
                ADD     SI,DI                   ;Adjust pointer into hopper
                MOV     BX,SI                   ;BX = End of alarm data
                MOV     TEMP1,BX                ;Save for later
                MOV     SI,ALARM_BUF_ST
                ADD     SI,DI
                MOV     TEMP2,SI
H015C:          LODSB                           ; Look for 'M'
                CMP     SI,BX
                JGE     H015X
                CMP     AL,'M'
                JNE     H015C
                MOV     ALARM_BUF_ST,SI
                LODSB                           ;Look for 'J' or 'N'
                CMP     SI,BX
                JGE     H015X
                CMP     AL,'J'
                JE      H015E
                CMP     AL,'N'
                JNE     H015C
                LODSB                           ;Look for 'A' in MNA:
                CMP     SI,BX
                JGE     H015X
                CMP     AL,'A'
                JNE     H015C
                LODSB
                CMP     AL,':'  ; "MNA:" ?
                JNE     H015C
;   Set Minor Alarm bit in status word
                MOV     SI,HPORT
                SHL     SI,1 ;*2
                OR      [STATUS_0 + SI],4       ;Minor alarm bit 2 on
                AND     [STATUS_0 + SI],0FF7FH  ;Port marked bit 7 off
                MOV     SI,OFFSET ALARM_MSG_2   ;"Minor "
                JMP     H015G
;   Cont ck for MJA:
H015E:          LODSB
                CMP     SI,BX
                JGE     H015X
                CMP     AL,'A'
                JNE     H015C
                LODSB
                CMP     AL,':'  ; "MJA:" ?
                JNE     H015C
;   Set MAJOR Alarm bit in status word
                MOV     SI,HPORT
                SHL     SI,1 ;*2
                OR      [STATUS_0 + SI],2       ;MAJOR alarm bit 1 on
                AND     [STATUS_0 + SI],0FF7FH  ;Port marked bit 7 off
                MOV     SI,OFFSET ALARM_MSG_1   ;"MAJOR "
;   Print alarm header and alarm
H015G:          CALL    PRINT_ALARMS
H015X:          POP     SI
                POP     BX
```

```
; Ck for SFM in alarm data
        PUSH    BX
        PUSH    SI
        MOV     BX,TEMP1            ;BX = End of alarm data
        MOV     SI,TEMP2            ;SI = start of alarm buffer
HO16A:  LODSB                       ; Look for 'S'
        CMP     SI,BX
        JGE     HO16B
        CMP     AL,'S'
        JNE     HO16A
        MOV     ALARM_BUF_ST,SI
        LODSB                       ;Look for 'F'
        CMP     SI,BX
        JGE     HO16B
        CMP     AL,'F'
        JNE     HO16A
        LODSB                       ;Look for 'M' in SFM
        CMP     SI,BX
        JGE     HO16B
        CMP     AL,'M'
        JNE     HO16A
; Found "SFM"
        MOV     SI,OFFSET ALARM_MSG_7   ;"S F M "
        CALL    PRINT_ALARMS ; Ck for "CXR"
HO16B:  MOV     BX,TEMP1            ;BX = End of alarm data
        MOV     SI,TEMP2            ;SI = start of alarm buffer
HO16C:  LODSB                       ; Look for 'C'
        CMP     SI,BX
        JGE     HO16D
        CMP     AL,'C'
        JNE     HO16C
        MOV     ALARM_BUF_ST,SI
        LODSB                       ;Look for 'X'
        CMP     SI,BX
        JGE     HO16D
        CMP     AL,'X'
        JNE     HO16C
        LODSB                       ;Look for 'R' in CXR
        CMP     SI,BX
        JGE     HO16D
        CMP     AL,'R'
        JNE     HO16C
; Found "CXR"
        MOV     SI,OFFSET ALARM_MSG_8   ;"CXR    "
        CALL    PRINT_ALARMS
HO16D:  POP     SI
        POP     BX
;
; ___ SLIDER ___             ;Slide data up into hopper
HO25:   MOV     CX,BX               ;Load ptr
        SUB     CX,SI
        MOV     BX,CX
        PUSH    ES
        MOV     AX,DATA
        MOV     ES,AX
        MOV     DI,OFFSET HOPPER
        ADD     SI,DI
        REP     MOVSB
        POP     ES
        MOV     HUNLOAD,0
        JMP     HREST
HOOSTEP1: JMP   HOO
; ___ DYNAMIC ___            ;Move data from hopper to dyn buffer
```

```
H030:       INC     SI                      ;Disregard line#
            CMP     SI,BX                   ;At load ptr?
            JE      HOOSTEP1
            MOV     AL,[HOPPER + SI]        ;Column char
            CMP     AL,1BH
            JNE     H031
            MOV     HUNLOAD,SI              ;ESC-Y-_-ESC
            JMP     HREST1
H031:       MOV     CR_FLG,0
;   Check for ESC-Y-_-_-ESC  (Cursor rehome or cursor home to clr line)
            PUSH    SI
            INC     SI
            CMP     SI,BX
            JE      H031A                   ;Not enough
            MOV     CL,[HOPPER + SI]
            CMP     CL,1BH                  ;ESC-Y-_-_-ESC ?
            JNE     H031B
            MOV     HUNLOAD,SI
            POP     SI
            JMP     HREST1
H031A:      POP     SI
            JMP     HOOUT
H031B:      POP     SI
            CMP     AL,20H                  ;Space? (ESC-Y-_-sp)
            JNE     H032
            MOV     CR_FLG,1
H032:       MOV     CX,0
;   Look for second ESC or '-)'
H033:       INC     SI
            INC     CX
            CMP     SI,BX                   ;At load ptr?
            JE      HOOSTEP1                ;Not enough
            MOV     AL,[HOPPER + SI]
            CMP     AL,1BH
            JE      H035
;   Check for '-)' : process same as ESC
            CMP     AL,'-'
            JNE     H034
            INC     SI
            INC     CX
            CMP     SI,BX                   ;At load ptr?
            JE      HOOSTEP1
            MOV     AL,[HOPPER + SI]
            CMP     AL,1BH                  ;ESC?
            JE      H035
            CMP     AL,')'
            JNE     H034
            INC     SI                      ;Treat like ESC
            INC     CX
            JMP     H035
H034:       JMP     H033
;   Move dynamic data from hopper to dyn. data area
H035:       PUSH    SI
            MOV     HUNLOAD,SI
            PUSH    ES
            MOV     AX,DYB_ST
            MOV     ES,AX
            MOV     DI,DYPTR
            CMP     CR_FLG,1
            JNE     H052
            MOV     AL,0DH                  ;CR
            STOSB
H052:       SUB     SI,CX
            MOV     AX,OFFSET HOPPER
            ADD     SI,AX
```

```
                INC     SI
                DEC     CX
;   Move 80 chars only
                CMP     CX,81
                JL      H053
                MOV     CX,80
H053:           REP     MOVSB
                POP     ES
                POP     SI
                MOV     DYPTR,DI
                MOV     CUR_DISP_FLAG,1         ;Refresh dyn disp
                JMP     H025
;   Display error message
HOPR_ERR:       MOV     CX,25
                MOV     SI,OFFSET MSG_ERR_9     ;"Input data error on port _"
                MOV     DI,1786                 ;Line 12 col 26
                MOV     AH,70H
HERR1:          LODSB
                STOSW
                LOOP    HERR1
                MOV     AX,HPORT
                CMP     AX,10
                JL      HERR2
                ADD     AX,7
HERR2:          ADD     AX,7030H
                STOSW
                MOV     AX,720H
                STOSW
                STOSW
                MOV     TIMER1,4
;   Restore data and variables for this port
;       Restore hopper
HREST:          PUSH    ES
                MOV     AX,DATA
                MOV     ES,AX
                MOV     AX,HPORT
                PUSH    AX                      ;Save port#
                MOV     DX,1024
                MUL     DX
                MOV     SI,OFFSET HOPPER
                MOV     DI,OFFSET HOPPER_0
                ADD     DI,AX
                MOV     CX,BX
                REP     MOVSB
                POP     AX
                POP     ES
;   Restore dyn buffer ptr
                MOV     DX,6
                MUL     DX
                MOV     SI,AX
                ADD     SI,2
                MOV     AX,DYPTR
                MOV     [DYBUF_START_0 + SI],AX
;   Restore hopper load and unload pointers
HREST1:         MOV     SI,HPORT
                SHL     SI,1    ;*2
                MOV     AX,HUNLOAD
                MOV     [HUNLOAD_0 + SI],AX     ;Restore unload ptr
                MOV     [HLOAD_0+ SI],BX        ;HLOAD ptr
                JMP     H00                     ;Next port
UNLOAD_HOPPERS  ENDP
;
```

;----- DYNAMIC DATA REVIEW CALCULATION -----
;
DYN_DATA_REVIEW_CALC    PROC    NEAR
;   Determine function  -   keyboard code in AH
        CMP     AH,79       ;'END' function?
        JE      D1
        CMP     AH,72       ;Line Up?
        JE      D10
        CMP     AH,80       ;Line down?
        JE      D20
        CMP     AH,73       ;Page Up?
        JE      D30
        CMP     AH,81       ;Page Down?
        JE      D40
JRET:   RET
;   Process 'END' key function
D1:     MOV     DYN_REV_FLAG,0
        CLD
        MOV     CUR_DISP_FLAG,1
        RET
;   Process "Line Up" function
D10:    CMP     DYN_REV_FLAG,1
        JE      D12
        MOV     BX,13                       ;13 CR's up from dyn ptr
        JMP     D60
D12:    MOV     BX,1
        JMP     D70
;   Process "Line Down" function
D20:    CMP     DYN_REV_FLAG,1
        JNE     D1          ;Clean up (just in case!)
        MOV     BX,1
        JMP     D80
;   Process "Pg Up" function
D30:    CMP     DYN_REV_FLAG,1
        JE      D32
        MOV     BX,24
        JMP     D60
D32:    MOV     BX,12
        JMP     D70
;   Process "Page Down" function
D40:    CMP     DYN_REV_FLAG,1
        JNE     D1          ;Clean up (just in case!)
        MOV     BX,12
        JMP     D80
;   Routine to determine dyn review pointer - first off-screen
D60:    MOV     SI,CUR_DYPTR
        CMP     SI,0
        JE      JRET
        PUSH    DS
        MOV     AX,CUR_DYBUF_ST
        MOV     DS,AX                       ; Point DS to dyn buffer area
        MOV     CX,0
        DEC     SI
        STD                 ;Backwords in data
D62:    LODSB
        CMP     AL,0DH  ;CR?
        JNE     D64
        INC     CX
        CMP     CX,BX       ;Correct # of cr's found?
        JNE     D64
        INC     SI
        INC     SI
        POP     DS
        MOV     DYN_REV_PTR,SI
        MOV     DYN_REV_FLAG,1  ;1st page up from normal screen

```
           JMP      DOOUT
D64:       CMP      SI,0
           JG       D62
           POP      DS
           CLD
           JMP      JRET      ;Cannot line/page up from 1st page!
;   Routine to move dyn review ptr up
D70:       MOV      SI,DYN_REV_PTR
           CMP      SI,0
           JNZ      D71
           RET
D71:       DEC      SI
           DEC      SI
           CMP      SI,0
           JNZ      D71A
           RET
D71A:      PUSH     DS
           MOV      AX,CUR_DYBUF_ST
           MOV      DS,AX
           MOV      CX,0
           STD
D72:       LODSB
           CMP      AL,0DH
           JNE      D74
           INC      CX
           CMP      CX,BX          ;Correct # of cr's found?
           JNE      D74
           INC      SI
           INC      SI
           POP      DS
           MOV      DYN_REV_PTR,SI
           JMP      DOOUT
D74:       CMP      SI,0
           JG       D72
           INC      SI
           POP      DS
           MOV      DYN_REV_PTR,SI
           JMP      DOOUT
;   Routine to move dyn review ptr DOWN
D80:       MOV      SI,DYN_REV_PTR
           MOV      DX,CUR_DYPTR
           CMP      SI,CUR_DYPTR
           JL       D81
           JMP      D1
D81:       PUSH     DS
           MOV      AX,CUR_DYBUF_ST
           MOV      DS,AX
           MOV      CX,0
           CLD
D82:       LODSB
           CMP      AL,0DH
           JNE      D84
           INC      CX
           CMP      CX,BX          ;Correct # of cr's found?
           JNE      D84
           POP      DS
           MOV      DYN_REV_PTR,SI
           JMP      DOOUT
D84:       CMP      SI,DX
           JL       D82
           POP      DS
           INC      SI
           MOV      DYN_REV_PTR,SI
;   Finish up
DOOUT:     MOV      CUR_DISP_FLAG,1
```

```
                CLD
                RET
DYN_DATA_REVIEW_CALC ENDP
;
;----- BELL OFF -----
;
BELL_OFF  PROC    NEAR        ;Turn audible off if on > 100ms
                CMP     MSEC1,0         ;Sound on?
                JNE     B00
                RET
;  Ck for elapsed time > 100ms
B00:    MOV     AL,MSEC         ;Current millisecs
                SUB     AL,MSEC1
                JP      B02
                ADD     AL,100          ;Adj current msec #
B02:    CMP     AL,10           ;100 ms or greater
                JG      B04
                RET
;  Turn sound off
B04:    IN      AL,61H          ;Port PB  SOUND OFF
                AND     AL,0FCH
                OUT     61H,AL
                MOV     MSEC1,0
                RET
BELL_OFF        ENDP
;
;-----DUMP DYNAMIC BUFFERS -----
;
DUMP_DYNAMIC_BUFFERS PROC NEAR
                MOV     BX,DYBUF_DUMP_SWITCH
                MOV     PORT_NO,0FFFFH
DDB01:  INC     PORT_NO         ;Next port
                CMP     PORT_NO,16      ;####
                JL      DDB02
                RET
DDB02:  MOV     AX,PORT_NO
                MOV     DX,6
                MUL     DX
                MOV     SI,AX
                CMP     [DYPTR_0 + SI],BX  ;Enough to dump?
                JL      DDB01              ;Not enough
;  Move data within buffer for now
                CLD
                MOV     AX,[DYBUF_START_0 + SI]
                MOV     CX,[DYPTR_0 + SI]       ;Load ptr
                MOV     DX,CX
                SUB     DX,DYBUF_DUMP_BYTES     ;New load ptr
                PUSH    SI
                MOV     SI,DYBUF_DUMP_BYTES
                MOV     DI,0
                SUB     CX,SI           ;Bytes to move
                SHR     CX,1            ;Div by 2 for words
                INC     CX
                PUSH    DS
                PUSH    ES
                MOV     ES,AX           ;Point es to dyn. buffer area
                MOV     DS,AX           ;Same with DS
                REP     MOVSW
                POP     ES
                POP     DS
                POP     SI
                MOV     [DYPTR_0 + SI],DX
                JMP     DDB01
DUMP_DYNAMIC_BUFFERS ENDP
;
;@@@@@@@@@ ASSEMBLY BREAK HERE @@@@@@@
```

```
;
    DISP_ERROR_MSG  PROC      NEAR      ;Message pointed to by SI - term by "$"
            CMP       TIMER1,0            ;Error disp timer reset?
            JNZ       DE0                 ;Display only for specified time
            RET
    DE0:    PUSH      DI
            PUSH      AX
            PUSH      CX
            MOV       DI,1760             ;Line 12
            MOV       AH,8FH              ;Attribute for flashing intense
    DE1:    MOV       CX,25               ;25 characters max.
            LODSB
            CMP       AL,'$'              ;Message terminated by '$'
            JZ        DE2
            STOSW
            LOOP      DE1
    DE2:    POP       CX
            POP       AX
            POP       DI
            RET
    DISP_ERROR_MSG  ENDP
;
    DISP_ERROR_MSG2 PROC      NEAR      ;Message pointed to by SI - term by "$"
    DE20:   MOV       DI,640              ;Line 5
            MOV       AH,07H
            MOV       AL,' '
            MOV       CX,80
            REP       STOSW
            MOV       DI,650
            MOV       AH,8FH              ;Attribute for flashing intense
    DE21:   MOV       CX,25               ;25 characters max.
            LODSB
            CMP       AL,'$'              ;Message terminated by '$'
            JZ        DE22
            STOSW
            LOOP      DE21
    DE22:   RET
    DISP_ERROR_MSG2 ENDP
;
;
;----- GET TIME -----
;
    GET_TIME  PROC    NEAR      ;CH=Hours  CL=Minutes  DH=Secs  DL=1/100 sec
;
            INC       STATUS2
            MOV       AL,STATUS2
            MOV       AH,7
            MOV       BX,114
            MOV       ES:[BX],AX
            MOV       AH,2CH    ;Function call to get time
            INT       21H
            MOV       MSEC,DL   ;Save milliseconds
            CMP       DH,SECS   ;Seconds changed?
            JNE       GT0_0
            RET
    GT0_0:  INC       SEC_5_CNTR ;Increment 5-sec counter
            INC       SEC5      ;5 second counter
            INC       SEC20     ;20 second counter
            MOV       SEC1,1
            CMP       TIMER1,0
            JZ        GT01
            DEC       TIMER1

; Process new time
    GT01:   MOV       SECS,DH
            CMP       CH,10     ;HOURS
```

```
              JL         GT0
              PUSH       AX
              MOV        AX,0
              MOV        AL,CH
              DIV        DIV_10    ;Separate hours tens
              MOV        BX,AX     ;Quotient in AL - Rem in AH
              POP        AX
              MOV        AL,BL
              ADD        AL,48
              MOV        AH,BH
              ADD        AH,48
              MOV        DTIME_H,AX
              JMP        GT0_1
GT0:          MOV        AL,48     ;Display hours < 10
              ADD        CH,48
              MOV        AH,CH
              MOV        DTIME_H,AX
GT0_1:        CMP        CL,10     ; MINUTES
              JL         GT1
              PUSH       AX
              MOV        AX,0
              MOV        AL,CL
              DIV        DIV_10    ;Separate minutes tens
              MOV        BX,AX     ;Quotient in AL - Rem in AH
              POP        AX
              MOV        AL,BL
              ADD        AL,48
              MOV        AH,BH
              ADD        AH,48
              MOV        DTIME_M,AX
              JMP        GT1_1
GT1:          MOV        AL,"0"
              MOV        AH,CL
              ADD        AH,48
              MOV        DTIME_M,AX
GT1_1:        CMP        DH,10     ; SECONDS
              JL         GT2
              PUSH       AX
              MOV        AX,0
              MOV        AL,DH
              DIV        DIV_10    ;Separate minutes tens
              MOV        BX,AX     ;Quotient in AL - Rem in AH
              POP        AX
              MOV        AL,BL
              ADD        AL,48
              MOV        AH,BH
              ADD        AH,48
              MOV        DTIME_S,AX
              JMP        GT3
GT2:          MOV        AL,"0"
              MOV        AH,DH
              ADD        AH,48
              MOV        DTIME_S,AX
; Update date every hour
GT3:          CMP        CH,HOURS
              JNE        GT4
              RET
GT4:          MOV        HOURS,CH
              MOV        AH,2AH          ;DOS call for date
              INT        21H             ;CX=YR | DH=Month | DL=Day
              CMP        DH,10     ; MONTH
              JL         GT5
              PUSH       AX
              MOV        AX,0
              MOV        AL,DH
```

```
              DIV     DIV_10    ;Separate minutes tens
              MOV     BX,AX     ;Quotient in AL - Rem in AH
              POP     AX
              MOV     AL,BL
              ADD     AL,48
              MOV     AH,BH
              ADD     AH,48
              MOV     DDATE_M,AX
              JMP     GT7
GT5:          MOV     AL,"0"
              MOV     AH,DH
              ADD     AH,48
              MOV     DDATE_M,AX
GT7:          CMP     DL,10     ; DAY
              JL      GT8
              PUSH    AX
              MOV     AX,0
              MOV     AL,DL
              DIV     DIV_10    ;Separate minutes tens
              MOV     BX,AX     ;Quotient in AL - Rem in AH
              POP     AX
              MOV     AL,BL
              ADD     AL,48
              MOV     AH,BH
              ADD     AH,48
              MOV     DDATE_D,AX
              JMP     GT9
GT8:          MOV     AL,"0"
              MOV     AH,DL
              ADD     AH,48
              MOV     DDATE_D,AX
GT9:          RET
GET_TIME      ENDP
;
;----- DISPLAY_TIME -----
;
DISPLAY_TIME  PROC    NEAR      ;Converted time in DTIME_H,M,S
              MOV     SI,OFFSET DTIME_H
              MOV     DI,SCREEN ;Loc to print time
              MOV     AH,70H    ;Inverse
              MOV     CX,2
;  Display Hours & Minutes
DT1:          LODSB
              STOSW
              LODSB
              STOSW
              MOV     AL,':'
              STOSW
              LOOP    DT1
;  Display Seconds
              LODSB
              STOSW
              LODSB
              STOSW
              RET
DISPLAY_TIME  ENDP
;
;----- DISPLAY STATIC SCREEN DATA ------
;
DISPLAY_STATIC_INFO   PROC    NEAR   ;Lines 1-11
              MOV     SI,CUR_STATIC_SCREEN_ST
              MOV     DI,0
              MOV     CX,880
              MOV     AH,07H            ;Attribute for display (normal)
```

```
DSI:    LODSB                           ;Char to display in AL
        STOSW                           ;AX to screen
        LOOP    DSI                     ;Do until CX=0
        RET
DISPLAY_STATIC_INFO ENDP
;
;----- DISPLAY DYNAMIC SCREEN DATA -----
;
DISPLAY_DYNAMIC_INFO    PROC    NEAR    ;Lines 14-25
        MOV     BX,CUR_DYPTR
        CMP     BX,0                    ;Is there something to display?
        JG      DD0_0
        RET
DD0_0:  CMP     CUR_DISP_FLAG,1         ;Refresh display?
        JE      DD0_1
        RET
DD0_1:  MOV     CUR_DISP_FLAG,0
        CMP     DYN_REV_FLAG,1
        JE      DD10
        PUSH    DS
;   Normal display
        MOV     AX,CUR_DYBUF_ST
        MOV     DS,AX                   ;Point data seg to dynamic data area
;   Count back 12 cr's from next char pointer in dyn data area
        MOV     CX,0
        MOV     SI,BX
        DEC     SI              ;Point to last char input to buffer
        STD                             ;Move backwards in data
DD0:    LODSB
        CMP     AL,0DH                  ;Ck for carriage return
        JNE     DD1
        INC     CX
        CMP     CX,12                   ;12 CR's only
        JNE     DD1
        INC     SI
        JMP     DD2
DD1:    CMP     SI,0                    ;Do not go before start of dscreen bufr
        JG      DD0
;   Display 1 DSCREEN amount
DD2:    MOV     CX,BX
        SUB     CX,SI                   ;Number of characters to display
;   Move dynamic data from dyn. buffer to dyn. screen area
        CLD
        INC     SI
        MOV     DX,1920
DD3:    CMP     CX,0                    ;More characters?
        JE      DD7
        DEC     CX
        JZ      DD7
        ADD     DX,160                  ;Next line
        CMP     DX,3999                 ;End of screen?
        JG      DD7
        MOV     DI,DX
        MOV     BX,0
        MOV     AH,7                    ;Normal attribute
DD4:    LODSB
        CMP     AL,0DH  ;CR?
        JE      DD5
        STOSW
        INC     BX                      ;Character counter
        LOOP    DD4
DD5:    PUSH    CX                      ;Blank out rest of line
        MOV     CX,80
        SUB     CX,BX
        JZ      DD6                     ;80 Characters printed
        MOV     AL,' '
```

```
            REP     STOSW
DD6:        POP     CX
            JMP     DD3
DD7:        POP     DS
            RET
;   Display off-page dynamic data in inverse
DD10:       CLD
            MOV     SI,DYN_REV_PTR
            MOV     CX,CUR_DYPTR
            PUSH    DS
            MOV     DX,CUR_DYBUF_ST
            MOV     DS,DX           ;Point data seg to dynamic data area
            MOV     DX,1920
            MOV     AH,70H          ;Inverse
DD11:       ADD     DX,160          ;Next line
            CMP     DX,3999         ;EOL?
            JG      DD7             ;Quit
            MOV     DI,DX
            MOV     BX,0
DD12:       LODSB                   ;Display line
            CMP     SI,CX           ;Beyond current dyn data ptr?
            JL      DD12A
            POP     DS
            MOV     DYN_REV_FLAG,0     ;Reset inverse screen
            MOV     CUR_DISP_FLAG,1    ;Refresh screen
            RET
DD12A:      CMP     AL,0DH
            JE      DD13
            STOSW
            INC     BX              ;Char count w/in line
            CMP     BX,80
            JGE     DD11            ;Next line
            JMP     DD12
DD13:       PUSH    CX
            MOV     CX,80           ;Blank out rest of line
            SUB     CX,BX
            JNZ     DD14
            POP     CX
            JMP     DD11
DD14:       MOV     AL,' '
            REP     STOSW
            POP     CX
            JMP     DD11
DISPLAY_DYNAMIC_INFO    ENDP
;
;----- DISPLAY STATUS -----
;
DISPLAY_STATUS  PROC    NEAR    ;Line 12 & 13 info.
;
;   Move site codes to status line #1
            CMP     TIMER1,0        ;Only if cmd or msg not on
            JNE     DS00
            MOV     SI,OFFSET SITE_CODES
            MOV     DI,1760         ;Line 12
            MOV     AH,7            ;Normal display
            MOV     CX,80
DS0:        LODSB
            STOSW
            LOOP    DS0
;   Update status line #2
DS00:       MOV     CX,0
            MOV     DI,1920         ;Line 13
DS01:       PUSH    CX
            MOV     SI,CX
            SHL     SI,1    ;*2
```

```
          MOV     DX,[STATUS_0 + SI]      ;Status in DX
          MOV     BX,CX
          MOV     AL,[HEX_CHAR_TABLE + BX]
          MOV     AH,7H
          STOSW
          TEST    DX,1                    ;Installed?
          JNZ     DS1
          MOV     AL,176                  ;Not inst
          STOSW
          STOSW
          MOV     AL,' '
          STOSW
          JMP     DSNEXT
;
DS1:      TEST    DX,10H                  ;Disabled?
          JZ      DS1A
          MOV     AH,70H                  ;Inverse
          MOV     AL,'O'
          STOSW
          MOV     AL,'S'
          STOSW
          MOV     AX,720H
          STOSW
          JMP     DSNEXT
;  Check for "NIGHT TRANSFER" and process
DS1A:     PUSH    SI
          MOV     AX,CX                   ;Port#
          PUSH    DX
          MOV     DX,960
          MUL     DX                      ;AX=AL*DX
          MOV     SI,OFFSET STATIC_SCREEN_0
          ADD     SI,AX
          POP     DX
          ADD     SI,63                   ;"Night xfer" area - 2
          MOV     CX,5
DS1B:     LODSB                           ;Look for 'N' over a 5-byte area
          CMP     AL,'N'
          LOOPNE  DS1B
          LODSB
          CMP     AL,'I'
          JNE     DS1E                    ;Not in nite xfer
          LODSB
          CMP     AL,'G'
          JNE     DS1E
;  NITE-XFER - Inverse site code on screen
          PUSH    DI
          SUB     DI,161                  ;1 Line up + 1 char back - attribute
          MOV     AL,70H  ;Inverse
          MOV     CX,4
DS1C:     STOSB
          INC     DI
          LOOP    DS1C
          POP     DI
          POP     SI
          OR      DX,300H                 ;Bit 10 ON - nite xfer bit
          MOV     [STATUS_0 + SI],DX
          JMP     DS2
DS1E:     POP     SI
          AND     DX,0FBFFH               ;Bit 10 OFF - nite xfer
          MOV     [STATUS_0 + SI],DX
;  Test for no response
DS2:      TEST    DX,8                    ;Not responding?
          JZ      DS3
          MOV     AH,8FH                  ;Flashing intense
          MOV     AL,'N'
          STOSW
```

```
              MOV      AL,'R'
              STOSW
              MOV      AX,720H
              STOSW
              AND      DX,0FFBFH        ;Bit 6 OFF - alarm bit
              MOV      [STATUS_0 + SI],DX
              JMP      DSNEXT
;   Test for bell
DS3:          TEST     DX,40H           ;Bell?
              JZ       DS5
              MOV      AH,0FH           ;Intense
              MOV      AL,'B'
              STOSW
              MOV      AL,'L'
              STOSW
              MOV      AX,720H
              STOSW
              AND      DX,0FFBFH        ;Clear bit 6 - bell
              MOV      [STATUS_0 + SI],DX
              JMP      DSNEXT
;   Test port marked flag
DS5:          TEST     DX,80H           ;MARK PORT?
              JZ       DS6
              MOV      AH,0FH           ;Intense
              MOV      AL,'m'
              STOSW
              MOV      AL,'k'
              STOSW
              MOV      AX,720H
              STOSW
              JMP      DSNEXT
;   Test major alarm flag
DS6:          TEST     DX,2             ;MAJOR alarm?
              JZ       DS7
              MOV      AH,89H           ;Intense blink underlined
              MOV      AL,'M'
              STOSW
              MOV      AL,'J'
              STOSW
              MOV      AX,720H
              STOSW
              JMP      DSNEXT
;   Test for Minor alarm flag
DS7:          TEST     DX,4             ;Minor alarm?
              JZ       DS20
              MOV      AH,9             ;Intense underlined
              MOV      AL,'M'
              STOSW
              MOV      AL,'n'
              STOSW
              MOV      AX,720H
              STOSW
              JMP      DSNEXT
;   Test fot clear port
DS20:         MOV      AH,7             ;CLEAR!
              MOV      AL,'c'
              STOSW
              MOV      AL,'l'
              STOSW
              MOV      AX,720H
              STOSW
              JMP      DSNEXT
DSMORE:  JMP DS01
DSNEXT:  STOSW
```

```
            POP     CX
;   Flash port code of site displayed
            CMP     CL,CUR_PORT_NUM
            JNE     DS25
            PUSH    CX
            PUSH    DI
            PUSH    SI
            MOV     AL,CL
            MOV     AH,0
            MOV     DX,10
            MUL     DX          ;AX=AL*DX
            MOV     SI,AX
            ADD     SI,1760 ;Line 12
            MOV     DI,SI
            MOV     CX,4
            PUSH    DS
            MOV     AX,ES
            MOV     DS,AX       ;Point to screen data
DS23:       LODSW
            OR      AX,8000H            ;Blink
            STOSW
            LOOP    DS23
            POP     DS
            POP     SI
            POP     DI
            POP     CX
;
DS25:       INC     CX
            CMP     CX,16
            JL      DSMORE
;   Display error message if IRQ error set
            MOV     DH,0
            CMP     IRQ3_ERR_FLAG,0
            JZ      DS27
            MOV     SI,OFFSET MSG_ERR_12
            MOV     DI,1920         ;Line 13
            MOV     AX,7020H                    ;Inverse
DS26:       STOSW
            LODSB
            CMP     AL,'$'
            JNE     DS26
            MOV     DL,IRQ3_ERR_FLAG
            JMP     DS29
DS27:       CMP     IRQ4_ERR_FLAG,0
            JZ      DS40
            MOV     SI,OFFSET MSG_ERR_13
            MOV     DI,2000         ;Line 13 col 40
            MOV     AX,7020H
DS28:       STOSW
            LODSB
            CMP     AL,'$'
            JNE     DS28
            MOV     DL,IRQ4_ERR_FLAG
;   Display status reg in binary
DS29:       MOV     CX,8
DS30:       TEST    DL,1        ;Test bit 1
            JZ      DS31
            MOV     AL,'1'
            STOSW
            SHR     DL,1
            LOOP    DS30
            MOV     AL,20H
            STOSW
            JMP     DS32
```

```
DS31:   MOV     AL,'0'
        STOSW
        SHR     DL,1
        LOOP    DS30
        MOV     AL,20H
        STOSW
DS32:   CMP     DH,1
        JE      DS40
        MOV     DH,1
        JMP     DS27        ;Ck IRQ4
DS40:   RET
DISPLAY_STATUS  ENDP
;
;
;----- DISPLAY PORT NAME -----
;
DISPLAY_PORT_NAME   PROC    NEAR    ;
        CMP     TIMER1,0                ;Message being displayed?
        JZ      DP0
        RET                             ;Do not display if there is
DP0:    MOV     AX,VIDEO_ADPT
        MOV     ES,AX
        MOV     DI,20       ;Line 1 col 10
        MOV     AH,70H      ;Inverse
        MOV     AL,CUR_PORT_CHAR
        STOSW
;   Place port name on screen
        MOV     AX,720H             ;Blank
        STOSW
        MOV     AH,70H      ;Inverse
        MOV     CX,16
        MOV     SI,OFFSET CUR_PORT_NAME
        MOV     DI,24       ;Column 12 (3rd char)
DPN:    LODSB               ;Char in AL
        STOSW               ;AX to screen
        LOOP    DPN
        MOV     AL,' '
        STOSW
        RET
DISPLAY_PORT_NAME   ENDP
;
;----- DISPLAY POP-UP SCREEN -----
;
DISPLAY_POP_UP1 PROC    NEAR    ;Display help screen
        MOV     DI,160
        MOV     SI,OFFSET POP_UP1
        MOV     AH,70H
        MOV     BX,0
PU10:   MOV     CX,30
PU11:   LODSB
        STOSW
        LOOP    PU11
        INC     BL
        CMP     BL,10
        JG      PU1OUT
        PUSH    AX
        MOV     AL,BL
        MOV     AH,0
        MOV     DX,160
        MUL     DX
        MOV     DI,AX
        ADD     DI,160
        POP     AX
        JMP     PU10
```

```
PU1OUT: RET
DISPLAY_POP_UP1 ENDP
;
;----- PRINT ALARMS TO PRINTER -----
;
PRINT_ALARMS    PROC    NEAR    ; "MAJOR p mm/dd hh:mm:ss site___ alarm__
;                               ; "Minor p mm/dd hh:mm:ss site___ alarm__
;   Print 'MAJOR ' or 'Minor '
        MOV     CX,6
PA1:    LODSB
        CALL    PT_BUFR_LD
        LOOP    PA1
;   Print port#
        MOV     SI,OFFSET HEX_CHAR_TABLE
        ADD     SI,HPORT
        LODSB
        CALL    PT_BUFR_LD
        MOV     AL,' '
        CALL    PT_BUFR_LD
        CALL    PRINT_DATE_TIME
;   Print site name
        MOV     SI,OFFSET PORT_NAME_0
        MOV     AX,HPORT
        MOV     DX,16
        MUL     DX
        ADD     SI,AX
        MOV     CX,16
PA5:    LODSB
        CALL    PT_BUFR_LD
        LOOP    PA5
        MOV     AL,' '
        CALL    PT_BUFR_LD
;   Print alarm
        MOV     SI,ALARM_BUF_ST
        DEC     SI          ;Adjust pointer
PA7:    LODSB
        CMP     SI,BX       ;BX=End of alarm data
        JG      PA10
        CALL    PT_BUFR_LD
        JMP     PA7
PA10:   MOV     AL,0DH   ;CR
        CALL    PT_BUFR_LD
PA20:   RET
PRINT_ALARMS    ENDP
;
;----- PRINT NIGHT TRANSFER CHANGE -----
;
PRINT_NXFER_CHANGE      PROC    NEAR    ;Print msg, site, date/time, msg
        MOV     PORT_NO,0           ;Test bit 10 of status reg. w/ nxfer_st
        JMP     PN2
PN1:    INC     PORT_NO
        CMP     PORT_NO,16
        JNE     PN2
        RET
PN2:    MOV     SI,PORT_NO
        SHL     SI,1
        MOV     AX,[STATUS_0 + SI]
        TEST    AX,400H             ;Bit 10
        JNZ     PN3                 ;Nxfer on
;   NXFER OFF - ck if it just went off
        CMP     [NXFER_STATUS + SI],0
        JE      PN1                 ;Was off
        MOV     [NXFER_STATUS + SI],0   ;NXFER TO OFF
        MOV     TEMP1,0
        MOV     SI,OFFSET ALARM_MSG_4   ;'nxoff '
        JMP     PN5
```

```
;   NXFER ON - Ck if it just went on
PN3:        CMP         [NXFER_STATUS + SI],1
            JE          PN1                     ;Was on
            MOV         [NXFER_STATUS + SI],1   ;NXFER TO ON
            MOV         TEMP1,1
            MOV         SI,OFFSET ALARM_MSG_3   ;'NX ON '
;   Print 'NX ON' or 'nxoff' message
PN5:        MOV         CX,6
PN6:        LODSB
            CALL        PT_BUFR_LD
            LOOP        PN6
            MOV         SI,OFFSET HEX_CHAR_TABLE
            ADD         SI,PORT_NO
            LODSB
            CALL        PT_BUFR_LD
            MOV         AL,' '
            CALL        PT_BUFR_LD
            CALL        PRINT_DATE_TIME
;   Print site name
            MOV         SI,OFFSET PORT_NAME_0
            MOV         AX,PORT_NO
            MOV         DX,16
            MUL         DX
            ADD         SI,AX
            MOV         CX,16
PN8:        LODSB
            CALL        PT_BUFR_LD
            LOOP        PN8
            MOV         AL,' '
            CALL        PT_BUFR_LD
            CMP         TEMP1,1
            JE          PN10
            MOV         SI,OFFSET ALARM_MSG_6   ;'... off'
            JMP         PN11
PN10:       MOV         SI,OFFSET ALARM_MSG_5   ;'... ON'
PN11:       LODSB
            CMP         AL,'$'
            JE          PN13
            CALL        PT_BUFR_LD
            JMP         PN11
PN13:       MOV         AL,0DH
            CALL        PT_BUFR_LD
            JMP         PN1
PRINT_NXFER_CHANGE      ENDP
;
;----- PRINT DATE & TIME -----
;
PRINT_DATE_TIME PROC    NEAR        ;MM/DD HH:MM:SS_
;   Print mm/dd
            MOV         SI,OFFSET DDATE_M
            LODSB
            CALL        PT_BUFR_LD
            LODSB
            CALL        PT_BUFR_LD
            MOV         AL,'/'
            CALL        PT_BUFR_LD
            LODSB
            CALL        PT_BUFR_LD
            LODSB
            CALL        PT_BUFR_LD
            MOV         AL,' '
            CALL        PT_BUFR_LD
;   Print time
            MOV         SI,OFFSET DTIME_H
            MOV         CX,2
```

```
PDT1:   LODSB
        CALL    PT_BUFR_LD
        LODSB
        CALL    PT_BUFR_LD
        MOV     AL,':'
        CALL    PT_BUFR_LD
        LOOP    PDT1
        LODSB
        CALL    PT_BUFR_LD
        LODSB
        CALL    PT_BUFR_LD
        MOV     AL,' '
        CALL    PT_BUFR_LD
        RET
PRINT_DATE_TIME ENDP
;
;----- PRINT STATIC SCREEN -----
;
PRINT_SSCREEN PROC NEAR          ;Place info from screen lines 1-13 into
        CMP     PT_ERR_FLAG,0    ;  printer buffer
        JE      PS1
        RET                      ;Pntr err - don't print
PS1:    MOV     AL,0DH   ;CR
        CALL    PT_BUFR_LD       ;Place char into pntr buffer
;  Print 40 '-'
        MOV     CX,40
        MOV     AL,'-'
PS3:    CALL    PT_BUFR_LD
        LOOP    PS3
        MOV     AL,0DH   ;CR
        CALL    PT_BUFR_LD
        CMP     PT_ERR_FLAG,1
        JNE     PS5
        RET                      ;Pntr error - quit
; Print screen lines 1 thru 13 after moving data into buffer
PS5:    MOV     AX,VIDEO_ADPT    ;Start of screen
        MOV     DI,OFFSET DSCREEN_BUFFER
        PUSH    DI
        ADD     DI,1040
        MOV     DSCREEN_BUFR_END,DI
        POP     DI
        PUSH    ES
        PUSH    DS
        MOV     DX,DS
        MOV     DS,AX
        MOV     ES,DX
        MOV     DX,DI
        MOV     SI,0
        MOV     CX,1040          ;13 lines
PS4:    LODSW
        STOSB
        LOOP    PS4
        POP     DS
        POP     ES
; Ck for blank line
PS7:    MOV     SI,DX
        MOV     CX,80
PS8:    LODSB
        CMP     AL,' '
        JNE     PS10     ;Print line if non-blank char. exists
        LOOP    PS8
        MOV     AL,0DH   ;Blank line - print CR
        CALL    PT_BUFR_LD
; Next line
```

```
PS9:        ADD     DX,80
            CMP     DX,DSCREEN_BUFR_END     ;Line 13?
            JL      PS7             ;Go to next line
; Print 40 '='
            MOV     CX,40
            MOV     AL,'='
PS9A:       CALL    PT_BUFR_LD
            LOOP    PS9A
            MOV     AL,0DH
            CALL    PT_BUFR_LD
            RET
; Print line
PS10:       MOV     SI,DX
            MOV     CX,80
PS11:       LODSB
            CALL    PT_BUFR_LD      ;Char in AL
            LOOP    PS11
            MOV     AL,0DH          ;CR
            CALL    PT_BUFR_LD
            JMP     PS9
PRINT_SSCREEN ENDP
;
;----- PRINT DYNAMIC SCREEN -----
;
PRINT_DSCREEN PROC NEAR             ;Place info from screen lines 14-25 in
            CMP     PT_ERR_FLAG,0   ;  printer buffer
            JE      PD1
            RET                     ;Pntr err - don't print
PD1:        MOV     AL,0DH  ;CR
            CALL    PT_BUFR_LD      ;Place char into pntr buffer
            CMP     PT_ERR_FLAG,1
            JNE     PD5
            RET                     ;Pntr error - quit
; Print screen lines 14 thru 25 after moving data into buffer
PD5:        MOV     AX,VIDEO_ADPT   ;Start of screen
            MOV     DI,OFFSET DSCREEN_BUFFER
            PUSH    DI
            ADD     DI,960  ;12 lines
            MOV     DSCREEN_BUFR_END,DI
            POP     DI
            PUSH    ES
            PUSH    DS
            MOV     DX,DS
            MOV     DS,AX
            MOV     ES,DX
            MOV     DX,DI
            MOV     SI,2080         ;Line 14
            MOV     CX,960          ;12 lines
PD4:        LODSW
            STOSB
            LOOP    PD4
            POP     DS
            POP     ES
; Ck for blank line
PD7:        MOV     SI,DX
            MOV     CX,80
PD8:        LODSB
            CMP     AL,' '
            JNE     PD10    ;Print line if non-blank char. exists
            LOOP    PD8
            MOV     AL,0DH  ;Blank line - print CR
            CALL    PT_BUFR_LD
; Next line
PD9:        ADD     DX,80
            CMP     DX,DSCREEN_BUFR_END     ;Last line
            JL      PD7             ;Go to next line
```

```
                MOV     AL,0DH
                CALL    PT_BUFR_LD
                RET
;   Print line
PD10:           MOV     SI,DX
                MOV     CX,80
PD11:           LODSB
                CALL    PT_BUFR_LD      ;Char in AL
                LOOP    PD11
                MOV     AL,0DH          ;CR
                CALL    PT_BUFR_LD
                JMP     PD9
PRINT_DSCREEN ENDP
;
;----- LOAD CHARACTER INTO PRINTER BUFFER -----
;
PT_BUFR_LD PROC NEAR                    ;Load printer buffer ; AL has char.
                PUSH    BX
PB0:            MOV     BX,PT_LOAD      ;   AL & BX changes
                MOV     [PT_BUFFER + BX],AL
                INC     BX
                CMP     BX,6144         ;End of buffer
                JC SHORT PB1
                MOV     BX,0
PB1:            CMP     BX,PT_UNLOAD    ;Pntr buffer full?
                JZ SHORT PBERR
                MOV     PT_LOAD,BX
                CMP     AL,0DH   ;CR?
                JNE     PB2
                MOV     AL,0AH   ;Auto-LF
                JMP     PB0
PB2:            POP     BX
                RET
PBERR:          PUSH    SI
                MOV     SI,OFFSET MSG_ERR_11     ;  "Buffer overflow"
                MOV     TIMER1,2
                CALL    DISP_ERROR_MSG
                POP     SI          /
                MOV     PT_ERR_FLAG,1
                POP     BX
                RET
PT_BUFR_LD ENDP
;
;----- PRINT CHARACTER FROM BUFFER -----
;
PRINT_IT PROC NEAR      ;Print info. in pntr buffer - 1 char per pass
;   Check printer status
                CMP     PT_ERR_FLAG,0
                JE      PI10
                MOV     PT_ERR_FLAG,0
                MOV     DX,PT_ADPT      ;Start addr of pntr adapter
                INC     DX
                IN      AL,DX
                TEST    AL,80H          ;Bit 7 = 1 if pntr clear
                JNZ     PI10    ;Pntr clear - continue
;   Printer fault
PIERR:          MOV     SI,OFFSET MSG_ERR_10    ;"Printer Fault"
                MOV     DI,1890         ;Line 12  col 65
                MOV     AH,9            ;Intense underlined
                MOV     CX,14
PIERR1:         LODSB
                STOSW
                LOOP    PIERR1
                MOV     TIMER1,1        ;Delay for 1 sec
                MOV     PT_ERR_FLAG,1
                RET
```

```
; Get char. from pntr buffer
PI10:   MOV     BX,PT_UNLOAD
        CMP     BX,PT_LOAD
        JNE     PI11        ;Nothing to print
        RET                 ;Nothing to print
; Ck for pntr busy
PI11:   MOV     DX,PT_ADPT
        INC     DX
PI12:   IN      AL,DX       ;Get pntr status
        CMP     AL,0FFH     ;Pntr turned off?
        JE      PIERR
        TEST    AL,80H      ;Bit 7 = 1 if not busy
        JNZ     PI13
; Ck for printer error
        TEST    AL,8H       ;Bit 3 = 1 if normal
        JZ      PIERR
        RET                 ;Printer too busy - bail out
PI13:   MOV     AL,[PT_BUFFER+BX]   ;Get char.
        AND     AL,7FH      ;Mask off high bit
        CMP     AL,0EH
        JL      PI13A
        CMP     AL,20H      ;Junk chars from ctl-n to ESC (Prt control)
        JL      PI14
PI13A:  MOV     DX,PT_ADPT
        OUT     DX,AL       ;Output char
        ADD     DX,2        ;Output cntl reg
        MOV     AL,0FH      ;Strobe bit = 1 ! auto-lf
        OUT     DX,AL
        MOV     AL,0EH      ;Strobe bit = 0 ! auto-lf
        OUT     DX,AL
PI14:   INC     BX          ;Unload ptr
        CMP     BX,6144     ;6K buffer
        JL      PI15
        MOV     BX,0
PI15:   MOV     PT_UNLOAD,BX    ;Update unload ptr
        RET                 ;1 char per pass
PRINT_IT ENDP
;
;----- TEST ALARM EXISTANCE -----
;
TEST_ALARMS_OFF PROC NEAR   ;Check for absence of alarms
        MOV     HPORT,0
        JMP     TA1
TA0:    INC     HPORT
        CMP     HPORT,16
        JL      TA1
        RET
TA1:    MOV     AX,HPORT
        MOV     DI,AX       ;Status reg. pointer
        SHL     DI,1
        TEST    [STATUS_0 + DI],1   ;Installed?
        JZ      TA0
        MOV     DX,960
        MUL     DX          ;AX=AL*DX
        MOV     SI,OFFSET STATIC_SCREEN_0
        ADD     SI,AX
        MOV     BX,SI
        MOV     DX,BX
        ADD     DX,960      ;DX=end of static screen
; Ck for 'M'
TA1A:   LODSB
        CMP     SI,DX
        JGE     NO_ALARM
        CMP     AL,'M'
        JNE     TA1A
        JMP     TA2A
```

```
;   Ck for MJA:
TA2:        LODSB
            CMP     SI,DX               ;End of buffer?
            JGE     NOMAJ
            CMP     AL,'M'
            JNE     TA2
TA2A:       LODSB
            CMP     AL,'J'
            JNE     TA2
            LODSB
            CMP     AL,'A'
            JNE     TA2
            LODSB
            CMP     AL,':'
            JNE     TA2
            JMP     TA2C
NOMAJ:      AND     [STATUS_0 + DI],0FFFDH      ;Bit 1 off
;   Ck for MNA:
TA2C:       MOV     SI,BX               ;Start of buffer
TA3:        LODSB
            CMP     SI,DX               ;End of buffer?
            JGE     NOMNA
            CMP     AL,'M'
            JNE     TA3
            LODSB
            CMP     AL,'N'
            JNE     TA3
            LODSB
            CMP     AL,'A'
            JNE     TA3
            LODSB
            CMP     AL,':'
            JNE     TA3
            JMP     TA0
NOMNA:      AND     [STATUS_0 + DI],0FFFBH      ;Bit 2 off
            JMP     TA0
NO_ALARM:   AND     [STATUS_0 + DI],0FFFBH
            AND     [STATUS_0 + DI],0FFFDH
            JMP     TA0
TEST_ALARMS_OFF  ENDP
;
;----- TEST BELL ALARM FROM SWITCH -----
;
TEST_BELL PROC  NEAR    ;Test port status for audible or NR
            MOV     SI,0    ; Flag set from unload-hoppers
            MOV     DX,0
            MOV     CX,0
            JMP     TB2
TB0:        INC     CX
            CMP     CX,16   ;####
            JE      TB4
;  Ck bit 6 of status reg - 1 if alarm on
TB2:        MOV     SI,CX
            SHL     SI,1                ;*2
            MOV     AX,[STATUS_0 + SI]
            TEST    AX,10H              ;Bit 4 - Turned down?
            JNZ     TB0
            TEST    AX,8                ;Port responding?
            JNZ     TB3                 ;Not resp.
            TEST    AX,40H              ;BIT 6 - Bell?
            JZ      TB0
            MOV     DX,1                ;Set bell-on flag
            JMP     TB0
;  Beep on NR once every 5 secs
TB3:        CMP     SEC_5_CNTR,5
            JNE     TB0
```

```
                MOV     DX,1
                JMP     TB0
; Set sound if alarm in
TB4:            CMP     DX,0
                JE      TB6
; Turn sound on
                IN      AL,61H          ;Port PB
                OR      AL,3            ;Gate spkr signal & timer 2 gate
                OUT     61H,AL
                MOV     AL,0B6H         ;Timer cmd: chan 2 mode 3
                OUT     43H,AL          ;8253 cmd reg
                MOV     BX,1989         ;600Hz
                MOV     AL,BL           ;LSB
                OUT     42H,AL
                MOV     AL,BH           ;MSB
                OUT     42H,AL
                MOV     AH,8
                MOV     AL,MSEC
                MOV     MSEC1,AL        ;Store msecs approx when sound on
                CMP     AL,0
                JNE     TB6
                MOV     MSEC1,1         ;At least 1 in msec flag
TB6:            RET
TEST_BELL       ENDP
;
;----- PORT TEST -----
;
PORT_TEST PROC  NEAR    ;Test by looping all character thru UART
                MOV     AH,0            ;AL has port#
                MOV     BX,AX           ;Save in BX
                MOV     PORT_TEST_FLAG,0
; Output message
                MOV     SI,OFFSET CMD5  ;"Test port "
                MOV     CX,OFFSET CMD6
                SUB     CX,SI           ;Length of message
                MOV     DI,1760         ;Line 12
                MOV     AH,7
PT0:            LODSB
                STOSW
                LOOP    PT0
                MOV     AL,[HEX_CHAR_TABLE + BX]
; Determine UART addr
                STOSW
                MOV     SI,BX
                SHL     SI,1            ;*2
                MOV     DX,[UART_0 + SI]        ;UART start addr
                ADD     DX,4
                IN      AX,DX
                PUSH    AX              ;Save current UART config
                PUSH    DX              ;Save UART start addr.
; Set up test
                MOV     AX,13H          ;LOOP, DTR, RTS
PT0A:           OUT     DX,AX
                MOV     TEST_CHAR,0AAH
                MOV     SI,0
                SUB     DX,4
; Loop characters thru UART 1ST pass then thru network
PT1:            MOV     CX,1000         ;Max test-for-ready tries
                CLI                     ;DISABLE INTERRUPTS!!!!
                IN      AL,DX           ;Unload
                MOV     AX,TEST_CHAR
                OUT     DX,AL           ;Output char to UART
                ADD     DX,5            ;RCVR data ready reg
PT1A:           IN      AL,DX
                TEST    AL,1            ;Bit 1 = 1 if ready
                JNZ     PT1A1           ;Ready
```

```
            LOOP    PT1A        ;Data not ready - try again
            JMP     PT2         ;Error
    PT1A1:  TEST    AL,1CH      ;Errors?
            JNZ     PT2
            SUB     DX,5
            IN      AL,DX       ;Input char
            STI                 ;REENABLE INTRR !!!
            CMP     AX,TEST_CHAR
            JNE     PT2         ;Error
            MOV     TEST_CHAR,0F0H
            INC     SI
            CMP     SI,1
            JE      PT1
    ; Test passed - ck for next test
            CMP     PORT_TEST_FLAG,1
            JE      PT1B
            MOV     PORT_TEST_FLAG,1
            ADD     DX,4
            MOV     AX,3        ;DTR, RTS
            JMP     PT0A
    ; Test ok
    PT1B:   MOV     SI,OFFSET CMD6   ;"Tests passed.  Port ="
            MOV     CX,OFFSET CMD7
            JMP SHORT PT3
    ; Error
    PT2:    STI
            CMP     PORT_TEST_FLAG,1
            JE SHORT PT2A
            MOV     SI,OFFSET CMD7   ;"INTERNAL TEST FAILED.  PORT ='
            MOV     CX,OFFSET CMD8
            JMP SHORT PT3
    PT2A:   MOV     SI,OFFSET CMD8   ;"NETWORK TEST FAILED.  PORT ="
            MOV     CX,OFFSET CMD9
    ; Output message
    PT3:    SUB     CX,SI
            MOV     DI,1760
            MOV     AH,70H      /
    PT4:    LODSB
            STOSW
            LOOP    PT4
            MOV     AL,[HEX_CHAR_TABLE + BX]
            STOSW
            MOV     TIMER1,3
            POP     DX
            POP     AX
            OUT     DX,AX       ;Restore UART config.
            RET
    PORT_TEST       ENDP
    ;
    ;----- TEST PORTS INACTIVE -----
    ;
    TEST_PORTS_INACTIVE     PROC    NEAR
            CMP     SEC_5_CNTR,5     ;Did 5 secs elapse since last test?
            JGE     TPI1
            RET
    ; Check port activity flag
    TPI1:   MOV     SEC_5_CNTR,0     ;Reset counter
            MOV     AX,PORT_ACT_FLAG
            PUSH    AX
            MOV     BX,-1
            MOV     CX,8000H         ;Bit 15 high
    TPI2:   INC     BX
            POP     AX               ;Recover flag
            PUSH    AX
            ROL     CX,1             ;Next port bit to test
            CMP     BX,16    ;16 ports
```

```
                JL      TPI2A
                POP     AX
                MOV     PORT_ACT_FLAG,0    ;Reset activity flags
                RET
;   Check if port installed & turned up
TPI2A:          PUSH    BX
                SHL     BX,1               ;Mul by 2 for word
                MOV     DX,[STATUS_0 + BX] ;Get status for port
                POP     BX
                TEST    DX,1               ;Installed ? Bit 0 = 1 if installed
                JZ      TPI2
                TEST    DX,10H             ;Turned down ? Bit 4 = 1 if down
                JNZ     TPI2
                TEST    AX,CX              ;Bit = 1 if port active
                JZ      TPI4
;   Update status for port
                AND     DX,0FF7H
                JMP     TPI5
TPI4:           OR      DX,108H            ;Not resp | ack req
TPI5:           PUSH    BX
                SHL     BX,1               ;*2
                MOV     [STATUS_0 + BX],DX
                POP     BX
                JMP     TPI2
TEST_PORTS_INACTIVE     ENDP

;----- TEST FOR NO RESPONSE ON ALL PORTS -----

TEST_NR PROC    NEAR
                MOV     CX,0               ;Clear flag
                MOV     BX,0
                JMP     TNR3
TNR2:           INC     BX
                CMP     BX,16
                JE      TNR6
;   Check if port installed & turned up
TNR3:           PUSH    BX
                SHL     BX,1      /        ;Mul by 2 for word
                MOV     DX,[STATUS_0 + BX] ;Get status for port
                POP     BX
                TEST    DX,1               ;Installed ? Bit 0 = 1 if installed
                JZ      TNR2
                TEST    DX,10H             ;Turned down ? Bit 4 = 1 if down
                JNZ     TNR2
                TEST    DX,80H             ;Bit 3 = 1 if NR
                JNZ     TNR5
                RET                        ;At least 1 not NR
TNR5:           INC     CX                 ;Count NR's
                JMP     TNR2
;   If number of ports w/ NR greater than 1 then reinit. UARTS
TNR6:           CMP     CX,1
                JG      TNR7
                RET
TNR7:           CLI                        ;Disable interrupts
                CALL    INIT_UARTS
                STI                        ;Enable intr.
                RET
TEST_NR ENDP
;
;----- TOGGLE PORT STATUS -----
;
TOGGLE_PORT_ABLE  PROC  NEAR               ;Enable / Disable port
                MOV     AH,0               ;AL has port#
                SHL     AX,1               ;AX=AX*2
                MOV     BX,AX
                MOV     DX,[STATUS_0 + BX] ;Get status word
```

```
            TEST    DX,1                ;Installed?
            JZ      TPAERR              ;Display error msg if not
            MOV     SEC_5_CNTR,0        ;Reset timer
            XOR     DX,10H              ;Toggle bit 4
TPA0:       MOV     [STATUS_0 + BX],DX
TPA00:      MOV     [INPTR_LOAD_0 + BX],0   ;Reset load ptr
            MOV     [INPTR_UNLOAD_0 + BX],0 ;Reset unload ptr
            MOV     [HLOAD_0 + BX],0
            MOV     [HUNLOAD_0 + BX],0
            RET
TPAERR:     MOV     SI,OFFSET MSG_ERR_6
            MOV     TIMER1,3            ;Display error for 3 secs
            CALL    DISP_ERROR_MSG
            RET
TOGGLE_PORT_ABLE ENDP
;
;----- TOGGLE PORT MARK ----
;
TOGGLE_PORT_MARK  PROC   NEAR     ;Mark /Unmark Port
            MOV     AH,0                ;AL has port#
            SHL     AX,1                ;AX=AX*2
            MOV     BX,AX
            MOV     DX,[STATUS_0 + BX]  ;Get status word
            TEST    DX,1                ;Installed?
            JZ      TPMERR
            TEST    DX,10H              ;If now OS then do nothing
            JZ      TPM0
            RET
TPM0:       XOR     DX,80H              ;Toggle bit 7
            MOV     [STATUS_0 + BX],DX
            RET
TPMERR:     MOV     SI,OFFSET MSG_ERR_6
            MOV     TIMER1,3            ;Display error for 3 secs
            CALL    DISP_ERROR_MSG
TOGGLE_PORT_MARK ENDP
;
;----- CLEAR BELL -----
;
CLEAR_BELL PROC NEAR       ;Clear bell flag and bell char in hopper
            MOV     AX,0
            MOV     CX,0
            MOV     AL,CUR_PORT_NUM
            PUSH    AX
;   Clear bell char in hopper for this port
            MOV     DI,AX
            SHL     DI,1
            MOV     BX,[HLOAD_0 + DI]   ;Hopper load ptr
            MOV     DX,1024
            MUL     DX
            MOV     SI,AX
            MOV     AX,OFFSET HOPPER_0
            ADD     SI,AX               ;Hopper start for this port
CB1:        MOV     AL,[SI]
            CMP     AL,7
            JNE     CB2
            MOV     AL,1
            MOV     [SI],AL
CB2:        INC     CX
            INC     SI
            CMP     CX,BX               ;Beyond hopper load pt?
            JL      CB1
;Clear bell flag in status reg for this port
            POP     AX
            MOV     SI,AX
            SHL     SI,1
            AND     [STATUS_0 + SI],0FFBFH  ;Bell flag off - bit 6
```

```
                RET
CLEAR_BELL  ENDP
;
;----- CLEAR DYNAMIC SCREEN -----
;
;
;----- CLEAR SCREEN -----
;
CLEAR_SCREEN    PROC    NEAR
        MOV     DI,0
        MOV     AX,720H         ;Blanks
        MOV     CX,2000
        CLD
        REP     STOSW
;   Clear static data area for port being displayed
        MOV     AL,CUR_PORT_NUM
        MOV     AH,0
        MOV     BX,AX
        MOV     DX,960          ;960 bytes
        MUL     DX              ;AX=AX*DX
        MOV     DI,OFFSET STATIC_SCREEN_0
        ADD     DI,AX
        PUSH    ES
        MOV     AX,DATA
        MOV     ES,AX
        MOV     CX,480          ;480 words , 960 bytes
        MOV     AX,2020H
        REP     STOSW
;   Place 12 CR's in dynamic data buffer
        MOV     AX,BX           ;Recover port #
        MOV     DX,6
        MUL     DX
        MOV     SI,AX
        MOV     AX,[DYBUF_START_0 + SI]
        MOV     ES,AX
        MOV     DI,[DYPTR_0 + SI]
        MOV     AX,0DH          ;CR
        MOV     CX,12       /
        REP     STOSW
        MOV     [DYPTR_0 + SI],DI
        POP     ES
        MOV     CUR_DISP_FLAG,1 ;Refresh display
;   Reset buffer pointers
        MOV     SI,BX           ;Recover port #
        SHL     SI,1
        MOV     [INPTR_LOAD_0 + SI],0
        MOV     [INPTR_UNLOAD_0 + SI],0
        MOV     [HLOAD_0 + SI],0
        MOV     [HUNLOAD_0 + SI],0
        RET
CLEAR_SCREEN    ENDP
;
;----- CLEAR DSCREEN -----
;
CLEAR_DSCREEN   PROC    NEAR    ;Clear lines 14-25
        PUSH    DI
        PUSH    CX
        PUSH    AX
        CLD
        MOV     DI,2080         ;Line 14
        MOV     CX,960          ;12 lines
        MOV     AX,720H         ;Blanks
        REP     STOSW
        POP     AX
        POP     CX
        POP     DI
```

```
                    RET
CLEAR_DSCREEN       ENDP
;
;
;****************************************************
;
;    INTERRUPT SERVICE ROUTINES
;
;****************************************************
;
;
;
;----- SERIAL PORT INTERRUPT SERVICE ROUTINE -----
;
;     PORTS 0-7    IRQ3
;
SERINT3 PROC       FAR          ;Process data from UARTs
          PUSH     AX
          PUSH     DS
          MOV      AX,DSEG
          MOV      DS,AX        ;Recover data segment
          INC      STATUS3      ;IRQ indicator
          CMP      IRQ3_ERR_FLAG,0
          JZ       SI00
          JMP      SIOUT        ;Error flag set - bail out
SI00:     PUSH     BX
          PUSH     CX
          PUSH     DI
          PUSH     SI
          PUSH     DX
          MOV      IRQ3_CNTR,0  ;Loop counter
SI0:      MOV      CX,0
          JMP SHORT SI2
;
SI1:      INC      CX
          CMP      CX,8         ;#####  PORTS 0-7
          JL SHORT SI2
          JMP SHORT SI_CK   /
SI2:      MOV      SI,CX
          SHL      SI,1         ;*2
SI3:      MOV      DX,[UART_0 + SI]  ;Serial line status reg.
          ADD      DX,5         ;(__DH)
          IN       AL,DX
          TEST     AL,1         ;Character in ?
          JZ       SI1          ;Nothing here
          MOV      AH,AL
          MOV      DX,[UART_0 + SI]       ;(__8H)
          IN       AL,DX        ;Input char to reenable interr.
;   Check port status
          MOV      BX,[STATUS_0 + SI]
          TEST     BL,1         ;Installed ?  (0 if not)
          JZ       SI1          ;Not installed
          TEST     BL,10H       ;Turned down ?  Bit4 =1 if down
          JNZ      SI1
;Read serial port data and check for error
          TEST     AH,1EH       ;Test for reception error
          JZ SHORT SI4          ;No error
          MOV      AL,'?'       ;Place a '?' in place of bad char.
          JMP SHORT SI5
SI4:      AND      AL,7FH       ;Mask off high bit
;  Place received character in buffer
SI5:      MOV      DI,CX        ;Set index to appropriate input buffer
          PUSH     CX
          MOV      CL,10
          SHL      DI,CL        ;*1024 to point to right in-buffer
          POP      CX
```

```
                MOV     BX,[INPTR_LOAD_0 + SI]  ;Load ptr
                MOV     [INBUF_0 + DI + BX],AL  ;Place in buffer
                INC     BX                      ;Incr buffer end
                CMP     BX,1024                 ;Wrap around?
                JC SHORT SI6                    ;Branch if not
                MOV     BX,0                    ;Yes wrap around
SI6:            CMP     BX,[INPTR_UNLOAD_0 +SI] ;Buffer full?
                JZ SHORT SI_CK                  ;Branch if yes - loose char
                MOV     [INPTR_LOAD_0 + SI],BX  ;New end of buffer
; Ck IRQ status reg.
SI_CK:          MOV     DX,IRQ3_STAT_REG
                IN      AL,DX
                TEST    AL,0FFH
                JZ SHORT SI_END
                INC     IRQ3_CNTR
                CMP     IRQ3_CNTR,50
                JL SHORT SIMORE
                MOV     IRQ3_ERR_FLAG,AL        ;Move status reg value into AL
                JMP     SI_END
SIMORE:  JMP    SIO
SI_END:  POP    DX
         POP    SI
         POP    DI
         POP    CX
         POP    BX
SIOUT:   POP    DS
                MOV     AL,20H                  ;Send EOI to 8259
                OUT     20H,AL
         POP    AX
         IRET                                   ;Return from interrupt
SERINT3  ENDP
;
;   PORTS 8-F   IRQ4
;
SERINT4  PROC   FAR      ;Process data from UARTs
         PUSH   AX
         PUSH   DS
                MOV     AX,DSEG
                MOV     DS,AX                   ;Recover data segment
                INC     STATUS4                 ;IRQ indicator
                CMP     IRQ4_ERR_FLAG,0
                JZ      SIOO_
                JMP     SIOUT_                  ;Error flag set - bail out
SIOO_:   PUSH   BX
         PUSH   CX
         PUSH   DI
         PUSH   SI
         PUSH   DX
                MOV     IRQ4_CNTR,0             ;Loop counter
SIO_:           MOV     CX,8
         JMP SHORT SI2_
;
SI1_:           INC     CX
                CMP     CX,16                   ;#####  PORT 8-F
         JL SHORT SI2_
         JMP SHORT SI_CK_
SI2_:           MOV     SI,CX
                SHL     SI,1                    ;*2
SI3_:           MOV     DX,[UART_0 + SI]        ;Serial line status reg.
                ADD     DX,5                    ;(__DH)
                IN      AL,DX
                TEST    AL,1                    ;Character in ?
                JZ      SI1_                    ;Nothing here
                MOV     AH,AL
                MOV     DX,[UART_0 + SI]        ;(__8H)
                IN      AL,DX                   ;Input char to reenable interr.
```

```
;   Check port status
        MOV     BX,[STATUS_0 + SI]
        TEST    BL,1                    ;Installed ?  (0 if not)
        JZ      SI1_                    ;Not installed
        TEST    BL,10H                  ;Turned down ?  Bit4 =1 if down
        JNZ     SI1_
;Read serial port data and check for error
        TEST    AH,1EH                  ;Test for reception error
        JZ SHORT SI4_                   ;No error
        MOV     AL,'?'                  ;Place a '?' in place of bad char.
        JMP SHORT SI5_
SI4_:   AND     AL,7FH                  ;Mask off high bit
;  Place received character in buffer
SI5_:   MOV     DI,CX                   ;Set index to appropriate input buffer
        PUSH    CX
        MOV     CL,10.
        SHL     DI,CL                   ;*1024 to point to right in-buffer
        POP     CX
        MOV     BX,[INPTR_LOAD_0 + SI]  ;Load ptr
        MOV     [INBUF_0 + DI + BX],AL  ;Place in buffer
        INC     BX                      ;Incr buffer end
        CMP     BX,1024                 ;Wrap around?
        JC SHORT SI6_                   ;Branch if not
        MOV     BX,0                    ;Yes wrap around
SI6_:   CMP     BX,[INPTR_UNLOAD_0 +SI] ;Buffer full?
        JZ SHORT SI_CK_                 ;Branch if yes - loose char
        MOV     [INPTR_LOAD_0 + SI],BX  ;New end of buffer
SI_CK_: MOV     DX,IRQ4_STAT_REG
        IN      AL,DX
        TEST    AL,0FFH
        JZ SHORT SI_END_
        INC     IRQ4_CNTR
        CMP     IRQ4_CNTR,50
        JL SHORT SIMORE_
        MOV     IRQ4_ERR_FLAG,AL        ;Move status reg value into AL
        JMP     SI_END_
SIMORE_:        JMP     SIO_
SI_END_: POP    DX
        POP     SI
        POP     DI
        POP     CX
        POP     BX
SIOUT_: POP     DS
        MOV     AL,20H                  ;Send EOI to 8259
        OUT     20H,AL
        POP     AX
        IRET                            ;Return from interrupt
SERINT4 ENDP
;
;
;*****************************************
;
;       INITIALIZATION SECTION
;
;*****************************************
;
;
;----- INITIALIZE BUFFERS -----
;
INIT_BUFFERS    PROC    NEAR    ;Sets dyn data area after stack area
        MOV     AX,SS
        MOV     BX,DS
        CMP     AX,BX                   ;Ck for stack start above code & data
        JLE     IERR1
        MOV     BX,DS
        CMP     AX,BX
```

```
          JG         IB1
IERR1:    MOV        CX,20       ;Send msg "SEGMENT SET-UP ERROR"
          MOV        SI,OFFSET MSG_ERR_1
          MOV        DI,2060
          REP        STOSW
          MOV        ERROR_FLAG,1    ;Set error flag
          RET
;  Set up dynamic data buffer areas
IB1:      MOV        AX,SS
          ADD        AX,11H      ;Begin dynamic buffers 16 bytes beyond SS top
          MOV        DI,OFFSET DYBUF_START_0
          MOV        CX,0
          MOV        DX,0
          PUSH       ES
          PUSH       AX
          MOV        AX,DATA
          MOV        ES,AX
          POP        AX
          JMP        IB3
IB2:      INC        CX
          CMP        CX,16
          JL         IB3
          POP        ES
          RET
IB3:      MOV        [DI],AX              ;DYBUF START
          ADD        DI,2
          MOV        [DI],DX              ;DYPTR
          ADD        AX,280H              ;Allow 10240 bytes for buffer
          ADD        DI,2
          MOV        [DI],AX              ;DYBUF END
          ADD        AX,1                 ;Allow 16 bytes for padding
          ADD        DI,2
          JMP        IB2
INIT_BUFFERS    ENDP
;
;----- INITIALIZE 8250 UART -----
;
;          7 DATA BITS, 1 STOP BIT, NO PARITY, & 1200 BAUD
;
INIT_UARTS      PROC   NEAR
          MOV        CX,0FFFFH
UI1:      INC        CX          ;Next port
          CMP        CX,16       ;####
          JL         UI2
          RET
UI2:      MOV        SI,CX
          SHL        SI,1        ;*2
          MOV        BX,[UART_0 + SI]    ;UART start addr
          MOV        AL,80H              ;To address baud rate divisor
          MOV        DX,BX               ;Addr of line cntrl reg
          ADD        DX,3
          OUT        DX,AL
;  Turn 'NR' code off
          AND        [STATUS_0 + SI],0FFF7H
;
          MOV        SI,OFFSET BAUD_RATE_CODES       ;Code for UARTS
          ADD        SI,CX
          LODSB                          ;Code in AL
          MOV        DX,BX
          OUT        DX,AL               ;UPDATE LSB
          CMP        AL,80H              ;300 BAUD?
          JNE        UI3
          MOV        AL,1                ;MSB VALUE (1 FOR 110-300 BAUD)
          JMP        UI4
UI3:      MOV        AL,0                ;MSB (0 FOR 1200-9600 BAUD)
UI4:      MOV        DX,BX               ;ADDR OF BAUD RATE DIVISOR MSB
```

```
                INC     DX
                OUT     DX,AL
;       Initialize line control register
                MOV     AL,7            ;NO PARITY, 1 STOP BIT, 8 DATA BITS
                MOV     DX,BX           ;ADDR OF LINE CNTL REG.
                ADD     DX,3
                OUT     DX,AL
;       Initialize modem control reg. for RTS, DTR & INTR
                MOV     AL,0BH          ;SET MODEM CNTL SIGNALS & INTERRUPT
                MOV     DX,BX           ;ADDR OF MODEM CNTL REG.
                ADD     DX,4
;===            MOV     AL,1BH  ;LOOP MODEM    ##########
                OUT     DX,AL
;       Enable serial port rcvr-data-rdy int
                MOV     AL,0            ;Disable all UART interrupts
                MOV     DX,BX           ;Addr of 8250 int. enable reg.
                INC     DX
                OUT     DX,AL           ;Do it
                DEC     DX
                IN      AL,DX           ;Empty input reg.
                INC     DX
                MOV     AL,1H           ;Enable rcvr-data-rdy reg.
                OUT     DX,AL
                JMP     UI1
INIT_UARTS      ENDP
;
;----- INITIALIZE SERIAL PORT INTERRUPTS -----
;
INIT_SERIAL_INT PROC    NEAR            ;Set up serial interrupt vectors
                PUSH    ES
                MOV     AX,0
                MOV     ES,AX           ;Point extra seg at int svc routine addr table
;       Set interrupt pointer for IRQ3
                MOV     DI,2CH  ;Offset of entry for type code 0BH - IRQ3
                MOV     AX,OFFSET SERINT3   ; Offset of serial int svc routine
                CLD                     ;Set forward string operations
                STOSW                   ;Place in table (AX -> [DI] )
                MOV     AX,CS           ;Segment of svc routine
                STOSW                   ;Place in table
;       Repeat for IRQ4
                MOV     AX,OFFSET SERINT4
                MOV     DI,30H  ;IRQ4
                STOSW
                MOV     AX,CS
                STOSW
                POP     ES
                RET
INIT_SERIAL_INT ENDP
;
;----- INITIALIZE DISK FILES -----
;
INIT_DISK_FILES PROC    NEAR            ;Create disk files - 1 per port
;       Move filename into File Control Block
                PUSH    ES
                MOV     AX,DATA
                MOV     ES,AX
                MOV     PORT_NO,0FFFFH
ID01:           INC     PORT_NO
                CMP     PORT_NO,16      ;####
                JL      ID02
                POP     ES
                RET
ID02:           MOV     SI,OFFSET FILENAME_0
                MOV     AX,PORT_NO
                MOV     DX,11
                MUL     DX
```

```
                ADD     SI,AX
                MOV     DI,OFFSET FCB+1
                MOV     CX,11                   ;8 primary + 3 ext
                CLD
                REP     MOVSB
;       Set DTA - Disk Transfer Area
                MOV     DX,OFFSET DTA
                MOV     AH,1AH                  ;Set DTA
                INT     21H
;       Initialze "Record Size", 'Current Block", and convert record
;           within FCB
                MOV     WORD PTR FCB+0CH,0      ;Current block = 0
                MOV     WORD PTR FCB+0EH,1      ;Record size = 1
                MOV     FCB+20H,0               ;Current record = 0
;       Create disk file
                MOV     DX,OFFSET FCB
                MOV     AH,16H                  ;Create
                INT     21H
;       Check for error
                CMP     AL,0
                JNZ     ID1
                MOV     DX,OFFSET FCB           ;Close this file
                MOV     AH,10H                  ;Close
                INT     21H
                JMP     ID01
ID1:            MOV     SI,OFFSET MSG_ERR_3
                POP     ES
                CALL    DISP_ERROR_MSG
                MOV     ERROR_FLAG,1
                MOV     TIMER1,3
                RET
INIT_DISK_FILES ENDP
;
INIT_PARAMETERS PROC NEAR
;       Turn cursor off
                MOV     DX,D6845_ADDR
                MOV     AL,10                   ;Cursor start addr
                OUT     DX,AL
                MOV     DX,D6845_DATA
                MOV     AL,20H                  ;No cursor disp
                OUT     DX,AL
;
                PUSH    ES
                MOV     AX,DATA
                MOV     ES,AX                   ;Point extra segment at data area
;       Move oddfile name into FCB
                MOV     SI,OFFSET ODDFILE
                MOV     DI,OFFSET FCB+1
                MOV     CX,11
                CLD
                REP     MOVSB
;       Set up Disk Transfer Area
                MOV     DX,OFFSET DTA1
                MOV     AH,1AH                  ;Set DTA
                INT     21H
;       Open parameter (ODD) file
                MOV     DX,OFFSET FCB
                MOV     AH,0FH                  ;Open
                INT     21H
                CMP     AL,0
                JE      IP00
                JMP     IPERR1
;       Read data from ODD file
IP00:           MOV     CX,0
IP0:            MOV     AH,14H                  ;Read
                INT     21H
```

```
                CMP     AL,0
                JG      IP01
                ADD     CX,128
                PUSH    DX
                MOV     DX,OFFSET DTA1
                ADD     DX,CX           ;Point to next record start in DS
                MOV     AH,1AH
                INT     21H             ;Reset DTA for next rec from ODD file
                POP     DX
                JMP     IP0
IP01:           MOV     BX,OFFSET DTA1-1
; Get port character from disk data
IP1:            INC     BX
                MOV     AL,[BX]         ;Get port char
                CMP     AL,0AH          ;Linefeed?
                JE      IP1             ;Ignore
                CMP     AL,0DH          ;CR ?   Should't get one here!
                JNE     IP1A
                JMP     IPERR2          ;Format error
IP1A:           CMP     AL,1AH          ;EOF?
                JNE     IP1B
                JMP     IPCLOSE
IP1B:           MOV     CUR_PORT_CHAR,AL ;save it
; Validate / Convert char to port#
                CMP     AL,46H          ;Char > 'F'
                JLE     IP1D
                JMP     IPERR
IP1D:           CMP     AL,30H          ;Char < '0'
                JGE     IP1E
                JMP     IPERR
IP1E:           SUB     AL,30H
                CMP     AL,9H           ;Char 0-9 ?
                JLE     IP2
                CMP     AL,10H          ;Char between 9 & A
                JG      IP1F
                JMP     IPERR
IP1F:           SUB     AL,7H
IP2:            MOV     CUR_PORT_NUM,AL ;Save port #
; Ck char past port# for blank
                INC     BX
                MOV     CL,[BX]
                CMP     CL,' '          ;S/B blank
                JE      IP2AA
                JMP     IPERR2
; Get baud rate from disk data
IP2AA:          INC     BX
                MOV     CH,[BX]
                INC     BX
                MOV     CL,[BX]
                CMP     CX,'03'
                JNE     IP20
                MOV     CL,80H          ;300 BAUD
                JMP     IP25
IP20:           CMP     CX,'12'
                JNE     IP21
                MOV     CL,60H          ;1200 BAUD
                JMP     IP25
IP21:           CMP     CX,'24'
                JNE     IP22
                MOV     CL,30H          ;2400 BAUD
                JMP     IP25
IP22:           CMP     CX,'48'
                JNE     IP23
                MOV     CL,18H          ;4800 BAUD
                JMP     IP25
IP23:           CMP     CX,'96'
```

```
            JNE     IPERR3
            MOV     CL,0CH          ;9600 BAUD
IP25:       MOV     DI,OFFSET BAUD_RATE_CODES
            MOV     AH,0
            ADD     DI,AX           ;AL has port#
            MOV     AL,CL
            STOSB
            ADD     BX,3            ;Skip next 3 chars
            MOV     CL,[BX]         ;Ck for space after baud rate
            CMP     CL,' '
            JNE     IPERR2
;   Get site code from disk
            MOV     AH,0
            MOV     AL,CUR_PORT_NUM
            MOV     DX,5            ;4 char code + 1 blank
            MUL     DX              ;AX=AL*DX
            MOV     DI,OFFSET SITE_CODES
            ADD     DI,AX
            MOV     CX,4
IP2A:       INC     BX
            MOV     AL,[BX]
            CMP     AL,0AH          ;LF? - format error
            JE      IPERR2
            CMP     AL,0DH          ;CR? - "
            JE      IPERR2
            STOSB
            LOOP    IP2A
            INC     BX
            MOV     AL,[BX]
            CMP     AL,' '          ;S/B space
            JNE     IPERR2
;   Get port name from disk data into data area
            MOV     AL,CUR_PORT_NUM
            MOV     AH,0
            MOV     DX,16
            MUL     DX              ;AX=AL*DX
            MOV     DI,OFFSET PORT_NAME_0   ;Point to first port name
            ADD     DI,AX
IP3:        INC     BX
            MOV     AL,[BX]
            CMP     AL,0AH          ;LF ?
            JE      IP3             ;Ignore
            CMP     AL,0DH          ;CR ?
            JE      IP4             ;Process record
            STOSB                   ;Store char
            JMP     IP3
;   Enable port - update status register
IP4:        MOV     AH,0
            MOV     AL,CUR_PORT_NUM
            SHL     AX,1            ;*2
            MOV     SI,AX
            MOV     [STATUS_0 + SI],21H   ;Comes alive 'c1'
            JMP     IP1
;   Error routine
IPERR1:  MOV    SI,OFFSET MSG_ERR_4_1 ;"Cannot open 'ODD' file"
         JMP    IPERR_
         RET
IPERR2:  MOV    SI,OFFSET MSG_ERR_7_1   ;"Format error in 'ODD' file"
         JMP SHORT IPERR_
IPERR3:  MOV    SI,OFFSET MSG_ERR_7_2 ;"Illegal baud rate ..."
         JMP SHORT IPERR_
IPERR:   MOV    SI,OFFSET MSG_ERR_7  ;"PORT NUM/CHAR ERR ..."
IPERR_:  POP    ES
         CALL   DISP_ERROR_MSG2
         MOV    ERROR_FLAG,1
         RET
```

```
IPCLOSE: MOV     DX,OFFSET FCB
         MOV     AH,10H
         INT     21H
         POP     ES
         RET
INIT_PARAMETERS ENDP
;
;
;
;----- ENABLE INTERRUPTS -----
;
; Enable timer, keyboard, and serial interrupts
;
ENABLE_INT     PROC    NEAR
         IN      AL,21H  ;Port for int mask reg
         MOV     INTMASK,AL  ;Save
         MOV     AL,0E0H ;Enable timer, kybd, & IRQ2-IRQ4
         OUT     21H,AL  ;Write intr mask reg.
         MOV     AL,20H  ;Clear 8259 intr.
         MOV     DX,20H
         OUT     DX,AL
         RET
ENABLE_INT     ENDP
;
START    ENDP
CODE     ENDS
;
         END     START
```

I claim:

1. A multiplexed terminal for continuously displaying the status of a plurality of remotely located stored program control telephone switches having remote control and display ports, said multiplexed terminal comprised of:

a computer having at least one I/O port;

first means coupled to said I/O port for providing a plurality of extended I/O ports;

means for coupling said extended I/O ports to dedicated channels for communication with remote control and display ports of remotely located stored program control telephone switches; and software means for controlling said computer, to multiplex said extended ports, and to simultaneously display clusters of data corresponding to the status and identification of each of said switches.

* * * * *